US010252161B2

(12) United States Patent
Tsukioka et al.

(10) Patent No.: US 10,252,161 B2
(45) Date of Patent: *Apr. 9, 2019

(54) VIDEO GAME PROCESSING PROGRAM AND VIDEO GAME PROCESSING METHOD

(71) Applicant: KABUSHIKI KAISHA SQUARE ENIX, Tokyo (JP)

(72) Inventors: Nobuhiro Tsukioka, Tokyo (JP); Yoshihiko Kobayashi, Tokyo (JP); Masaki Ono, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 15/412,845

(22) Filed: Jan. 23, 2017

(65) Prior Publication Data

US 2017/0128833 A1    May 11, 2017

Related U.S. Application Data

(63) Continuation of application No. 14/190,883, filed on Feb. 26, 2014, now Pat. No. 9,586,134.

(Continued)

(30) Foreign Application Priority Data

Apr. 3, 2013    (JP) ................................ 2013-077947
May 29, 2013    (JP) ................................ 2013-113318

(51) Int. Cl.
*A63F 13/525*    (2014.01)
*A63F 13/00*    (2014.01)
(Continued)

(52) U.S. Cl.
CPC ............ *A63F 13/525* (2014.09); *A63F 13/00* (2013.01); *A63F 13/10* (2013.01); *A63F 13/12* (2013.01);
(Continued)

(58) Field of Classification Search
CPC ................................ A63F 13/525; A63F 13/35
(Continued)

(56) References Cited

U.S. PATENT DOCUMENTS 9,586,134 B2 *  3/2017  Tsukioka ................ A63F 13/12
2007/0099702 A1  5/2007  Tupper
(Continued)

FOREIGN PATENT DOCUMENTS

JP    2006-087458    4/2006
JP    2007-505673    3/2007
(Continued)

OTHER PUBLICATIONS

Office Action from Japan Patent Office (JPO) in Japanese Patent Appl. No. 2015-049065, dated Sep. 19, 2017.
(Continued)

*Primary Examiner* — Jason Skaarup
(74) *Attorney, Agent, or Firm* — Greenblum & Bernstein, P.L.C.

(57) ABSTRACT

A plurality of characters including a player character appears in a video game. An arrangement position of at least one of characters is specified in a virtual space in accordance with progress of the video game. A display mode is set up to any one of a first display mode and a second display mode. A game control is carried out in the first display mode in which a photographed image of the virtual space photographed by a virtual camera is displayed on a game screen or the second display mode in which an arrangement image is displayed on the game screen. Each of the plurality of characters is arranged at a predetermined position in the arrangement image with a predetermined relationship with the arrangement position of the corresponding character in the virtual space. The game control is carried out in the display mode thus set up.

17 Claims, 22 Drawing Sheets

Related U.S. Application Data

(60) Provisional application No. 61/769,931, filed on Feb. 27, 2013.

(51) Int. Cl.
*A63F 13/30* (2014.01)
*A63F 13/40* (2014.01)
*A63F 13/35* (2014.01)
*A63F 13/533* (2014.01)
*A63F 13/847* (2014.01)
*A63F 13/822* (2014.01)

(52) U.S. Cl.
CPC ............ *A63F 13/35* (2014.09); *A63F 13/533* (2014.09); *A63F 13/822* (2014.09); *A63F 13/847* (2014.09)

(58) Field of Classification Search
USPC .......................................... 463/29, 30, 31, 32
See application file for complete search history.

(56) References Cited

U.S. PATENT DOCUMENTS

| | | |
|---|---|---|
| 2009/0215533 A1 | 8/2009 | Zalewski et al. |
| 2011/0039619 A1 | 2/2011 | Kojima et al. |
| 2011/0304620 A1 | 12/2011 | Yamada et al. |
| 2012/0302352 A1 | 11/2012 | Ajami et al. |
| 2012/0309529 A1 | 12/2012 | Westlund et al. |

FOREIGN PATENT DOCUMENTS

| | | |
|---|---|---|
| JP | 2007-319311 | 12/2007 |
| JP | 2009-279038 | 12/2009 |
| JP | 2010-061477 | 3/2010 |
| JP | 2010-124878 | 6/2010 |
| JP | 2010-142346 | 7/2010 |
| JP | 2011-515736 | 5/2011 |
| JP | 2011-142997 | 7/2011 |
| JP | 2011-212296 | 10/2011 |
| JP | 2011-258022 | 12/2011 |
| JP | 2012-178060 | 9/2012 |
| JP | 2012-210539 | 11/2012 |
| JP | 2014-161723 | 9/2014 |
| WO | 2005/028052 | 3/2005 |
| WO | 2009/108645 | 9/2009 |

OTHER PUBLICATIONS

Office Action from Japan Patent Office (JPO) in Japanese Patent Appl. No. 2015-050705, dated Mar. 21, 2017, together with a partial English language translation.

Office Action from Japan Patent Office (JPO) in Japanese Patent Appl. No. 2013-077947, dated Aug. 26, 2014, along with an English language translation.

Office Action from Japan Patent Office (JPO) in Japanese Patent Appl. No. 2013-113318, dated Aug. 26, 2014, along with an English language translation.

"'Square Enix Legend World' which you can enjoy powerful 3D battle is the browser game that the Square Enix work total appearance seems not to be a dream", 4Gamer.net, [online], [Search on Aug. 19, 2014], available at <http://www.4gamer.net/games/185/G018547/2013040284/>, together with a partial English language translation.

"Open Beta Test of 'Square Enix Legend World' start today. Insert opening movie, abnormal state attack also adds and battle is more strategically", 4Gamer.net, [online], [Search on Aug. 19, 2014], available at <http://www.4gamer.net/games/185/G018547/201304 11046/>, together with a partial English language translation.

Office Action from Japan Patent Office (JPO) in Japanese Patent Appl. No. 2013-113318, dated Dec. 22, 2015, together with an English language translation.

Game Software for PlayStation, "ALB Airland Battle SCPS10015" Manual, Accepted on Sep. 18, 1998, p. 41, together with a partial English language translation.

Office Action from Japan Patent Office (JPO) in Japanese Patent Appl. No. 2015-049065, dated Jun. 27, 2017, together with a partial English language translation.

Office Action from Japan Patent Office (JPO) in Japanese Patent Appl. No. 2015-050705, dated Aug. 1, 2017, together with a partial English language translation.

"'Square Enix Legend World' which you can enjoy powerful 3D battle is the browser game that the Square Enix work total appearance seems not to be a dream", 4Gamer.net, [online], (Aug. 19, 2014], available at http://www.4gamer.net/games/185/G018547/20130402084/.

"Open Beta Test of 'Square Enix Legend World' start today. Insert opening movie, abnormal state", 4Gamer.net, [online], (Aug. 19, 2014), available at http://www.4gamer.net/games/185/G018547/20130411046/.

Office Action from Japan Patent Office (JPO) in Japanese Patent Appl. No. 2018-008808, dated Jan. 15, 2019, together with a partial English language translation.

\* cited by examiner

Fig. 25

QUEST INFORMATION

| QUEST NAME | QUEST TYPE | ENEMY CHARACTER | VIEW MODE TYPE | CONSUMPTION ENERGY | MAJOR ACQUIRED ITEM | ... |
|---|---|---|---|---|---|---|
| QUEST A | SEARCH | CHARACTER A | – | 10 | ..... | ... |
| QUEST B | SEARCH | CHARACTER B | – | 10 | ..... | ... |
| QUEST C | SUBJUGATION | CHARACTER C | REAL VIEW MODE | 20 | ..... | ... |
| QUEST C | SUBJUGATION | CHARACTER C | SIMPLE VIEW MODE | 20 | ..... | ... |
| QUEST D | SUBJUGATION | CHARACTER D | REAL VIEW MODE | 20 | ..... | ... |
| QUEST D | SUBJUGATION | CHARACTER D | SIMPLE VIEW MODE | 20 | ..... | ... |
| ⋮ | ⋮ | ⋮ | ⋮ | ⋮ | ⋮ | ⋮ |

VIDEO GAME PROCESSING PROGRAM AND VIDEO GAME PROCESSING METHOD

CROSS REFERENCE TO RELATED APPLICATION

This is a continuation application of U.S. patent application Ser. No. 14/190,883, filed Feb. 26, 2014, which claims the benefit of priority from U.S. Provisional Application No. 61/769,931, filed on Feb. 27, 2013, and relates to subject matter contained in Japanese Patent Application No. 2013-077947, filed on Apr. 3, 2013 and Japanese Patent Application No. 2013-113318, filed on May 29, 2013. The disclosure of each of the applications is expressly incorporated herein by reference in its entirety.

BACKGROUND OF THE INVENTION

1. Field of the Invention

At least one of embodiments according to the present invention relates to a video game processing program and a video game processing system for controlling progress of a video game in which a plurality of characters including a player character operated by a user appears.

2. Description of the Related Art

Heretofore, it is known a system for providing game experience to a user by moving an avatar in a three-dimensional virtual space and displaying an image photographed by a virtual camera on a display device. In techniques related to such a system, for example, there is one in which a user is allowed to select a cloth model that the user wants to put on an avatar in a common virtual space, whereby the user creates a user-specific model readily (see Japanese Patent Application Publication No. 2010-61477, for example).

Processings carried out in such a system includes: a modeling process to move the avatar in the three-dimensional virtual space; and a rendering process to cause the display device to display the image photographed by the virtual camera. The processings gives a considerable load onto a GPU and the like of the system (for example, a user terminal). For that reason, in the conventional system, a method of reducing a processing load by reducing a pixel number of the image or the like has been adopted.

However, the user who is required to reduce a processing load views or browses an image deteriorated from original display (that is, an original image quality). For this reason, there has been a problem that this specification of the system may lose interest in the system (video game and the like) of the user.

SUMMARY OF THE INVENTION

It is an object of at least one of embodiments according to the present invention to solve the problem described above, and to allow a difference that may occur in game experience of each of a plurality of users to be reduced.

According to a first non-limiting viewpoint, in order to achieve the above object, in one aspect of the present invention, the present invention is directed to a non-transitory computer-readable medium including a video game processing program product for causing a computer to control progress of a video game. In this case, a plurality of characters including a player character operated by a player appears in the video game. The video game processing program product causes the computer to execute steps including specifying an arrangement position of at least one of the plurality of characters in a virtual space in accordance with progress of the video game.

The steps also include setting up a battle mode to any one of a first battle mode and a second battle mode, a battle control being carried out in the first battle mode in which a photographed image of the virtual space photographed by a virtual camera is displayed on a battle screen, a battle control being carried out in the second battle mode in which an arrangement image is displayed on the battle screen, each of the plurality of characters being arranged at a predetermined position in the arrangement image with no relationship with the arrangement position of the corresponding character in the virtual space.

The steps also include carrying out a battle control in the battle mode set up in the setting up a battle mode.

In the non-transitory computer-readable medium according to the present invention, it is preferable that the steps further include: determining an action effect based on an action of each of the plurality of characters in a battle; and setting up an arrangement position of each of the plurality of characters in the virtual space to a fixed position in a case where the battle mode is set up to the second battle mode in the setting up a battle mode, wherein in the determining an action effect, the action effect is determined based on positional relationship information corresponding to a fixed position that is the arrangement position of the at least one of the plurality of characters specified in the specifying an arrangement position.

In the non-transitory computer-readable medium according to the present invention, it is preferable that the steps further include: determining an action effect based on an action of each of the plurality of characters in a battle; and determining an arrangement position of each of the plurality of characters in the virtual space to be any one of a plurality of prescribed positions in a case where the battle mode is set up to the second battle mode in the setting up a battle mode, wherein in the determining the arrangement position, the arrangement position is changed into other prescribed position in accordance with progress of the battle control, and wherein in the determining an action effect, the action effect is determined based on positional relationship information corresponding to any prescribed position at which the at least one of the plurality of characters specified in the specifying an arrangement position is arranged.

In the non-transitory computer-readable medium according to the present invention, it is preferable that any one battle mode of the first battle mode and the second battle mode is set up in accordance with performance information of a video game processing apparatus in the setting up a battle mode.

In the non-transitory computer-readable medium according to the present invention, it is preferable that any one battle mode of the first battle mode and the second battle mode is set up in accordance with a setup operation by the player in the setting up a battle mode.

In the non-transitory computer-readable medium according to the present invention, it is preferable that the steps further include: transmitting battle control information to a video game processing server connected via a communication network, the battle control information indicating a control content of the battle control.

In another aspect of the present invention, there provides a video game processing server in which the video game processing program described above is installed.

Further, in the video game processing server according to the present invention, it is preferable that the battle control information is transmitted to other video game processing server.

In still another aspect of the present invention, the present invention is directed to a non-transitory computer-readable medium including a terminal program product for causing a video game processing terminal to control progress of the video game while displaying a game screen on a display screen of a display device. The terminal program product according to the present invention causes the video game processing terminal to execute connecting the video game processing terminal to a video game processing server via a communication network. In this case, the video game processing server includes: an arrangement position specifier for specifying an arrangement position of at least one of the plurality of characters in a virtual space in accordance with progress of the video game; a mode setter for setting up a battle mode to any one of a first battle mode and a second battle mode, a battle control being carried out in the first battle mode in which a photographed image of the virtual space photographed by a virtual camera is displayed on a battle screen, a battle control being carried out in the second battle mode in which an arrangement image is displayed on the battle screen, each of the plurality of characters being arranged at a predetermined position in the arrangement image with no relationship with the arrangement position of the corresponding character in the virtual space; and a battle controller for carrying out a battle control in the battle mode set up in the setting up a battle mode.

Further, in another embodiment of the non-transitory computer-readable medium, the non-transitory computer-readable medium according to the present invention includes a video game processing program product for causing a video game processing server to control progress of a video game carried out by a video game processing apparatus. In this case, a plurality of characters including a player character operated by a player of the video game processing apparatus appears in the video game. The video game processing server is connected to the video game processing apparatus via a communication network. The video game processing program product causing the computer to execute steps including specifying an arrangement position of at least one of the plurality of characters in a virtual space in accordance with progress of the video game.

The steps also include setting up a battle mode to any one of a first battle mode and a second battle mode, a battle control being carried out in the first battle mode in which a photographed image of the virtual space photographed by a virtual camera is displayed on a battle screen in the video game processing apparatus, a battle control being carried out in the second battle mode in which an arrangement image is displayed on the battle screen in the video game processing apparatus, each of the plurality of characters being arranged at a predetermined position in the arrangement image with no relationship with the arrangement position of the corresponding character in the virtual space.

The steps also include carrying out a battle control in the battle mode set up in the setting up a battle mode.

In the non-transitory computer-readable medium according to another embodiment of the present invention, it is preferable that the steps further include: determining an action effect based on an action of each of the plurality of characters in a battle; and setting up an arrangement position of each of the plurality of characters in the virtual space to a fixed position in a case where the battle mode is set up to the second battle mode in the setting up a battle mode, wherein in the determining an action effect, the action effect is determined based on positional relationship information corresponding to a fixed position that is the arrangement position of the at least one of the plurality of characters specified in the specifying an arrangement position.

In the non-transitory computer-readable medium according to another embodiment of the present invention, it is preferable that the steps further include: determining an action effect based on an action of each of the plurality of characters in a battle; and determining an arrangement position of each of the plurality of characters in the virtual space to be any one of a plurality of prescribed positions in a case where the battle mode is set up to the second battle mode in the setting up a battle mode, wherein in the determining the arrangement position, the arrangement position is changed into other prescribed position in accordance with progress of the battle control, and wherein in the determining an action effect, the action effect is determined based on positional relationship information corresponding to any prescribed position at which the at least one of the plurality of characters specified in the specifying an arrangement position is arranged.

In the non-transitory computer-readable medium according to another embodiment of the present invention, it is preferable that any one battle mode of the first battle mode and the second battle mode is set up in accordance with performance information of a video game processing apparatus in the setting up a battle mode.

In the non-transitory computer-readable medium according to another embodiment of the present invention, it is preferable that any one battle mode of the first battle mode and the second battle mode is set up in accordance with a setup operation by the player in the setting up a battle mode.

In the non-transitory computer-readable medium according to another embodiment of the present invention, it is preferable that the steps further include: receiving battle control information from the video game processing apparatus connected via the communication network, the battle control information indicating a control content of the battle control.

In another aspect of the present invention, there provides a video game processing system provided with a video game processing apparatus and a video game processing server. In this case, a plurality of characters including a player character operated by a player appears in the video game carried out by the video game processing apparatus. The video game processing server is connected to the video game processing apparatus via a communication network. The video game processing system includes an arrangement position specifier for specifying an arrangement position of at least one of the plurality of characters in a virtual space in accordance with progress of the video game. The video game processing system also includes a mode setter for setting up a battle mode to any one of a first battle mode and a second battle mode, a battle control being carried out in the first battle mode in which a photographed image of the virtual space photographed by a virtual camera is displayed on a battle screen in the video game processing apparatus, a battle control being carried out in the second battle mode in which an arrangement image is displayed on the battle screen in the video game processing apparatus, each of the plurality of characters being arranged at a predetermined position in the arrangement image with no relationship with the arrangement position of the corresponding character in the virtual space.

The video game processing system also includes a battle controller for carrying out a battle control in the battle mode set up in the setting up a battle mode.

In the video game processing system according to the present invention, it is preferable that the video game processing system further includes: an action effect determiner determining an action effect based on an action of each of the plurality of characters in a battle; an arrangement position fixer for setting up an arrangement position of each of the plurality of characters in the virtual space to a fixed position in a case where the mode setter sets up the battle mode to the second battle mode, wherein the action effect determiner determines the action effect based on positional relationship information corresponding to a fixed position that is the arrangement position of the at least one of the plurality of characters specified by the arrangement position specifier.

In the video game processing system according to the present invention, it is preferable that the video game processing system further includes: an action effect determiner for determining an action effect based on an action of each of the plurality of characters in a battle; an arrangement position determiner for determining an arrangement position of each of the plurality of characters in the virtual space to be any one of a plurality of prescribed positions in a case where the mode setter sets up the battle mode to the second battle mode, wherein the arrangement position determiner changes the arrangement position into other prescribed position in accordance with progress of the battle control, and wherein the action effect determiner determines the action effect based on positional relationship information corresponding to any prescribed position at which the at least one of the plurality of characters specified by the arrangement position specifier is arranged.

In the video game processing system according to the present invention, it is preferable that the mode setter sets up any one battle mode of the first battle mode and the second battle mode in accordance with performance information of the video game processing apparatus.

In the video game processing system according to the present invention, it is preferable that the mode setter sets up any one battle mode of the first battle mode and the second battle mode in accordance with a setup operation by the player.

In the video game processing system according to the present invention, it is preferable that the video game processing apparatus includes a battle control information transmitter for transmitting battle control information to a video game processing server connected via the communication network, the battle control information indicating a control content of the battle control.

In still another aspect of the present invention, there provides a video game processing apparatus for controlling progress of a video game. In this case, a plurality of characters including a player character operated by a player appears in the video game. The video game processing apparatus according to the present invention includes an arrangement position specifier for specifying an arrangement position of at least one of the plurality of characters in a virtual space in accordance with progress of the video game.

The video game processing apparatus further include a mode setter for setting up a battle mode to any one of a first battle mode and a second battle mode, a battle control being carried out in the first battle mode in which a photographed image of the virtual space photographed by a virtual camera is displayed on a battle screen, a battle control being carried out in the second battle mode in which an arrangement image is displayed on the battle screen, each of the plurality of characters being arranged at a predetermined position in the arrangement image with no relationship with the arrangement position of the corresponding character in the virtual space.

The video game processing apparatus further include a battle controller for carrying out a battle control in the battle mode set up by the mode setter.

In the video game processing apparatus according to the present invention, it is preferable that the video game processing apparatus further includes an action effect determiner for determining an action effect based on an action of each of the plurality of characters in a battle, wherein the action effect determiner determines the action effect of the action based on relative position information corresponding to a relative position between the character carrying out the action and the other character.

According to a second non-limiting viewpoint, in order to achieve the above object, in still another aspect of the present invention, the present invention is directed to a video game processing method of causing a video game processing server to control progress of a video game carried out by a video game processing apparatus. In this case, a plurality of characters including a player character operated by a player of the video game processing apparatus appears in the video game. Further, the video game processing server is connected to the video game processing apparatus via a communication network. The video game processing method according to the present invention includes specifying an arrangement position of at least one of the plurality of characters in a virtual space in accordance with progress of the video game.

The video game processing method also includes setting up a battle mode to any one of a first battle mode and a second battle mode, a battle control being carried out in the first battle mode in which a photographed image of the virtual space photographed by a virtual camera is displayed on a battle screen in the video game processing apparatus, a battle control being carried out in the second battle mode in which an arrangement image is displayed on the battle screen in the video game processing apparatus, each of the plurality of characters being arranged at a predetermined position in the arrangement image with no relationship with the arrangement position of the corresponding character in the virtual space.

The video game processing method also includes carrying out a battle control in the battle mode set up in the setting up a battle mode.

Further, in another embodiment of the video game processing method, the video game processing method of controlling progress of a video game carried out by a video game processing apparatus is carried out by a video game processing server. In this case, a plurality of characters including a player character operated by a player of the video game processing apparatus appears in the video game. Further, the video game processing server is connected to the video game processing apparatus via a communication network. The video game processing method according to the present invention includes specifying an arrangement position of at least one of the plurality of characters in a virtual space in accordance with progress of the video game.

The video game processing method also includes setting up a battle mode to any one of a first battle mode and a second battle mode, a battle control being carried out in the first battle mode in which a photographed image of the virtual space photographed by a virtual camera is displayed on a battle screen in the video game processing apparatus, a battle control being carried out in the second battle mode in which an arrangement image is displayed on the battle screen in the video game processing apparatus, each of the plurality of characters being arranged at a predetermined position in the arrangement image with no relationship with the arrangement position of the corresponding character in the virtual space.

The video game processing method also includes carrying out a battle control in the battle mode set up in the setting up a battle mode.

According to each embodiment of the present invention, it is possible to solve one or two or more deficiencies or shortages (that is, the problems).

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 25 is an explanatory drawing showing an example of a storage state of video game information according to at least one embodiment of the present invention;

DETAILED DESCRIPTION OF THE INVENTION

Hereinafter, an example of embodiments according to the present invention will be described with reference to the appending drawings. In this regard, various kinds of elements (or components) in the example of each embodiment, which will be described below, can be combined appropriately in a range that inconsistency occurs. Further, explanation of the content explained as an example of one embodiment may be omitted in other embodiment. Further, the content of operations and/or processings with no relationship to characterizing portions or features of each embodiment may be omitted. Moreover, the order of various kinds of processes that constitute various kinds of processing flows (flowcharts) explained below may become random order in a range that inconsistency occurs in the processing content.

First Embodiment

Figure 1:
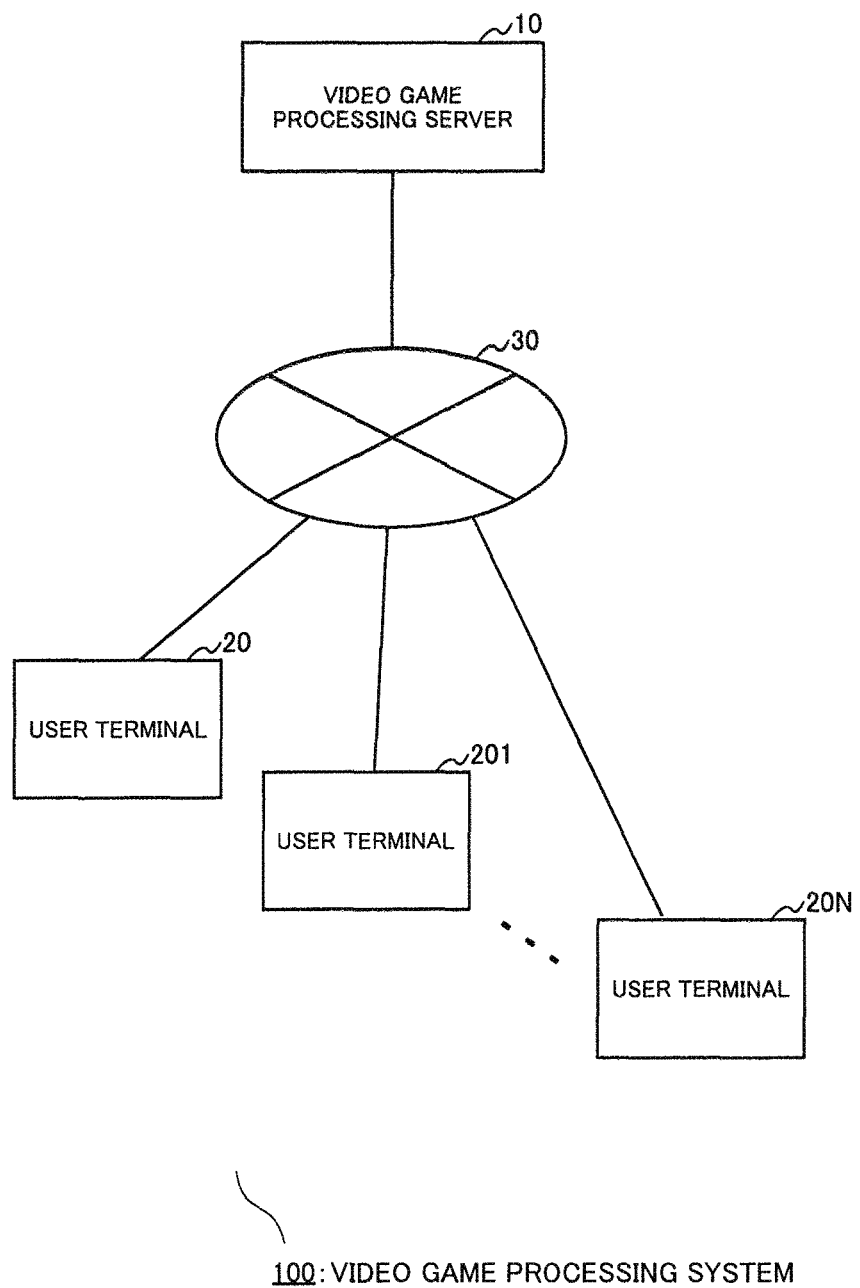
FIG. 1 is a block diagram showing an example of a configuration of a video game processing system according to at least one embodiment of the present invention.

FIG. 1 is a block diagram showing an example of a configuration of a video game processing system 100 according to one embodiment of the present invention. As shown in FIG. 1, the video game processing system 100 includes: a video game processing server 10; and user terminals 20, 201 to 20N ("N" is an arbitrary integer) respectively used by a plurality of users. In this regard, the configuration of the video game processing system 100 is not limited to this configuration. The video game processing system 100 may be configured so that a plurality of users uses a single user terminal. Further, the video game processing system 100 may be configured so as to include a plurality of servers.

Each of the video game processing server 10 and the plurality of user terminals 20, 201 to 20N is connected to a communication network 30 such as the Internet. In this regard, although it is not shown in the drawings, each of the plurality of user terminals 20, 201 to 20N is connected to the communication network 30 by carrying out data communication with a base station managed by a carrier by means of a wireless communication line.

The video game processing system 100 has various kinds of functions to control progress of a video game (a so-called online game) in which a plurality of players plays in the same virtual space (including a synchronous virtual space and an asynchronous virtual space).

The video game processing server 10 is managed by an administrator of the video game processing system 100, and has various kinds of functions to provide (or deliver) information on the video game to the user terminal 20, 201 to 20N.

The video game processing server 10 is configured by an information processing apparatus such as a WWW server, and includes a storage medium for storing various kinds of information. In this regard, in the video game processing system 100, it is preferable that the video game processing server 10 manages information regarding the video game from a viewpoint to reduce a processing load on each of the plurality of user terminals 20, 201 to 20N.

Figure 2:
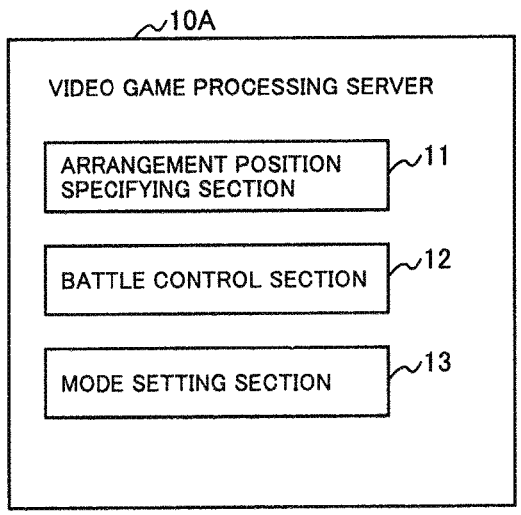
FIG. 2 is a block diagram showing a configuration of a video game processing server according to at least one embodiment of the present invention.

FIG. 2 is a block diagram showing a configuration of a video game processing server 10A that is an example of the video game processing server 10 according to one embodiment of the present invention. The video game processing server 10A at least includes: an arrangement position specifying section 11; a battle control section 12; and a mode setting section 13. In this regard, the video game processing server 10A is provided with a general configuration for carrying out the video game, such as a control section, a communication section and the like. However, its explanation herein is omitted.

The arrangement position specifying section 11 has a function to specify an arrangement position of a character in the virtual space in accordance with progress of the video game.

The battle control section 12 has a function to carryout a control of a battle in each of plural kinds of battle modes. In the present embodiment, the battle control section 12 has a function (first battle control function) to carry out a battle control in the first battle mode and a function (second battle control function) to carry out a battle control in the second battle mode.

Here, the first battle mode is a battle mode in which a photographed image in the virtual space photographed by a virtual camera is displayed on a battle screen. Further, the second battle mode is a battle mode in which an arrangement image, in which each of the plurality of characters is arranged at a predetermined position with no relationship with the arrangement position of the corresponding character in the virtual space, is displayed on the battle screen.

The mode setting section 13 has a function to set up any one battle mode of the first battle mode and the second battle mode.

Next, an operation of the video game processing system 100 according to the present embodiment will be described.

Figure 3:
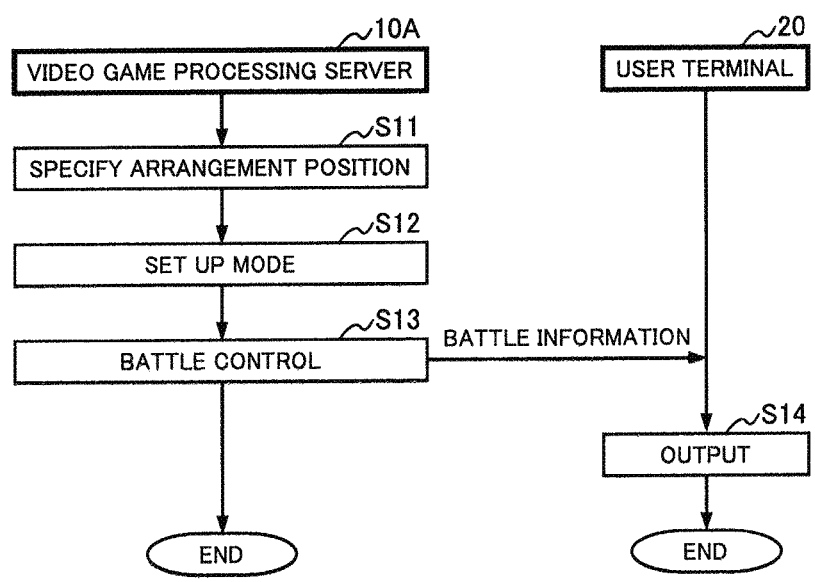
FIG. 3 is a flowchart showing an example of game processing according to at least one embodiment of the present invention.

FIG. 3 is a flowchart showing an example of game processing carried out by the video game processing system 100. In the game processing according to the present embodiment, processing to arrange a character in the virtual space and to carry out a battle control in any one mode of at least two or more modes is carried out.

The game processing is started in a case where the video game processing server 10A receives a request to start the game processing from the user terminal 20, for example.

In the game processing, the video game processing server 10A specifies an arrangement position (Step S11). Subsequently, the video game processing server 10A sets the battle mode to any one battle mode of the first battle mode and the second battle mode (Step S12), and carries out a battle control in the battle mode thus set up (Step S13).

On the other hand, the user terminal 20 receives the information generated by the battle control (battle information) from the video game processing server 10A, and carries out an output according to the received battle information (Step S14). In this regard, as the output according to the battle information, the user terminal 20 outputs an image or sound indicating a battle by a plurality of characters, for example.

Figure 4:
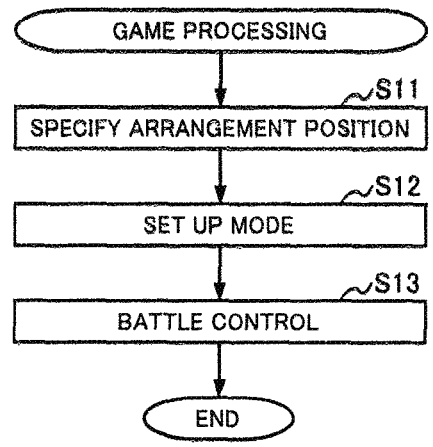
FIG. 4 is a flowchart showing an example of an operation of the video game processing server in the game processing according to at least one embodiment of the present invention.

FIG. 4 is a flowchart showing an example of an operation of the video game processing server 10A in the game processing according to at least one embodiment of the present invention. In the game processing, the video game processing server 10A specifies an arrangement position (Step S11); sets up any one battle mode of the first battle mode and the second battle mode (Step S12); and carries out a battle control in the battle mode thus set up (Step S13). Namely, in the present embodiment, the video game processing server 10A carries out processing for the battle control by selecting one battle mode from the plurality of battle modes each using an arrangement position of each character in the virtual space without using functions included in the user terminal 20.

As explained above, as one aspect of the first embodiment, the video game processing server 10A is configures so as to include: the arrangement position specifying section 11; the battle control section 12; and the mode setting section 13. Thus, the video game processing server 10A specifies the arrangement position of each character in the virtual space in accordance with progress of the video game; carries out the battle control in the first battle mode, in which the photographed image of the virtual space photographed by the virtual camera is displayed on the battle screen, or the second battle mode, in which the arrangement image, in which each of the plurality of characters is arranged at a predetermined position with no relationship with the arrangement position of the corresponding character in the virtual space, is displayed on the battle screen; sets the battle mode to any one mode of the first battle mode and the second battle mode; and carries out the battle control in the battle mode thus set up. Therefore, it is possible to reduce a difference that may occur in game experience of each of a plurality of users.

However, the video game processing system 100 may be configured so that each of the plurality of user terminals 20, 201 to 20N manages part or all of the information regarding the video game.

Figure 5:
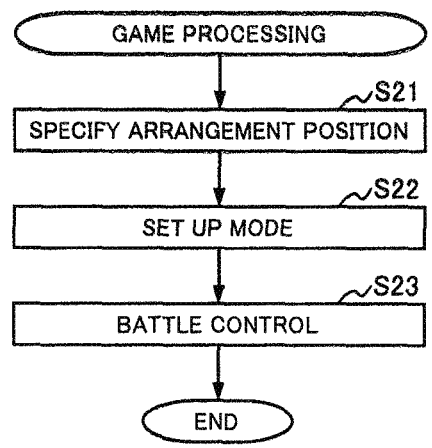
FIG. 5 is a flowchart showing an example of an operation of a user terminal in a case where the user terminal carries out the game processing according to at least one embodiment of the present invention.

FIG. 5 is a flowchart showing an example of an operation of the user terminal 20 in a case where the user terminal 20 carries out the game processing. In the game processing, the user terminal 20 specifies an arrangement position (Step S21); sets up any one battle mode of the first battle mode and the second battle mode (Step S22); and carries out a battle control in the battle mode thus setup (Step S23). In this regard, since the output of the battle control is not necessary in order to accomplish the object of the first embodiment, the explanation herein is omitted.

In this regard, in the first embodiment, a player character means a character that a player (that is, a user of the user terminal) can operate of a plurality of characters appearing in the video game. In this regard, various kinds of objects each of which may be an operation target by a player, such as a so-called avatar, are included in the concept of the player character.

Further, in the first embodiment, the battle screen is a screen showing or presenting a battle by a plurality of characters that appears in the video game (for example, the player character and an enemy character). In this regard, the battle screen has to express a battle (which means not only a mere battle, but also a fight in the broad sense, such as a competition, a match (victory or defeat) and the like), but it is not really necessary that an image showing a character is displayed on the battle screen.

Further, in the first embodiment, "no relationship" means that one of a plurality of elements does not influence on the other each other. Namely, the "position of a character in the virtual space" and the "position of the character in an arrangement image" do not influence on each other. Therefore, in a case where a position of a character (for example, a character C1) in the virtual space is moved during progress of a battle in the second battle mode, the position of the character C1 in the arrangement image may not be moved, for example.

Further, in the first embodiment, the battle control means that progress of a battle among a plurality of characters is controlled in accordance with a predetermined rule related to the setup content of a predetermined item, an operation of the player and the like.

Further, in the first embodiment, the arrangement position means a position (or a coordinate) within the virtual space in which a character is arranged in accordance with a condition that is satisfied in accordance with progress of the video game, for example. In the first embodiment, in order to specify an arrangement position of a character in the virtual space in accordance with progress of the video game, the video game processing system 100 may be configured so that the arrangement position specifying section 11 specifies an "arrangement position of each character according to progress of the video game" on the basis of only a processing capacity (or throughput) of the video game processing system 100 itself. Alternatively, the video game processing system 100 may be configured so that the arrangement position specifying section 11 specifies the "arrangement position of each character according to progress of the video game" using a processing capacity of other processing apparatus. As the other processing apparatus, it is thought an apparatus connected by the communication network.

Second Embodiment

Figure 6:
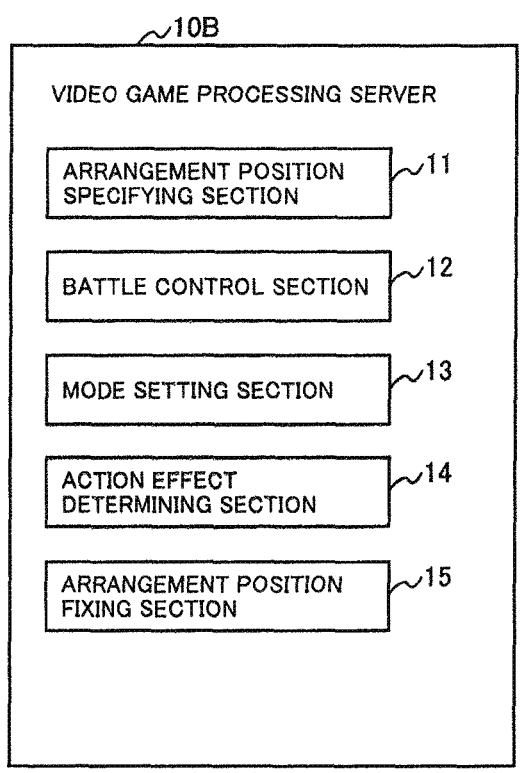
FIG. 6 is a block diagram showing a configuration of the video game processing server according to at least one embodiment of the present invention.

FIG. 6 is a block diagram showing a configuration of a video game processing server 10B that is an example of the video game processing server 10 according to one embodiment of the present invention. In the present embodiment, the video game processing server 10B at least includes: an arrangement position specifying section 11; a battle control section 12; a mode setting section 13; an action effect determining section 14; and an arrangement position fixing section 15.

The action effect determining section 14 has a function to determine an action effect based on an action of each character in a battle.

The arrangement position fixing section 15 has a function to set up (or fix) an arrangement position of each character in the virtual space to a fixed position when the mode setting section 13 sets up a battle mode to a second battle mode. Further, in the present embodiment, the action effect determining section 14 has a function to determine an action effect based on positional relationship information corresponding to a fixed position that is the arrangement position of each character specified by the arrangement position specifying section 11.

Here, as an example of the positional relationship information, it is thought various kinds of information that can be derived on the basis of a position of one character, such as information indicating a "distance from the fixed position of an action executing character to the fixed position of an action target character".

Figure 7:
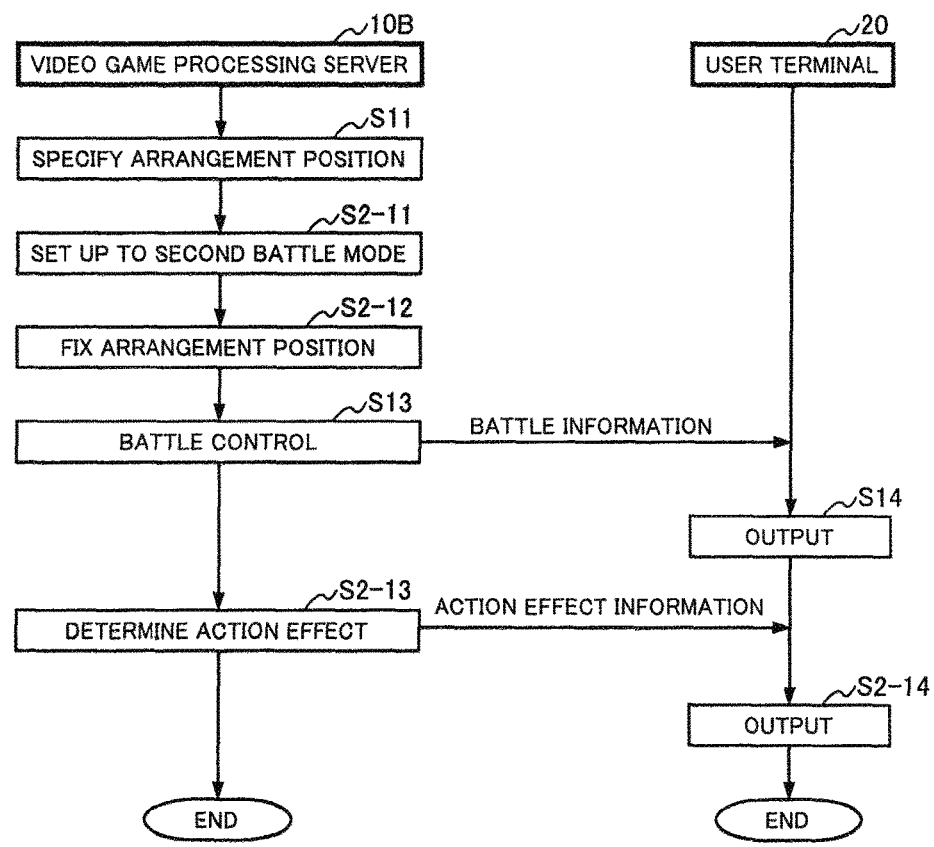
FIG. 7 is a flowchart showing an example of the game processing according to at least one embodiment of the present invention.

FIG. 7 is a flowchart showing an example of the game processing carried out by the video game processing system 100. Hereinafter, an operation of each of the video game processing server 10B and the user terminal 20 will be described as an example. In this regard, explanation of a flowchart showing an operation of each of the video game processing server 10B and the user terminal 20 is omitted in view of avoidance of repeating explanation.

In the game processing according to the present embodiment, when the arrangement position is specified (Step S11), the video game processing server 10B sets up the battle mode to the second battle mode (Step S2-11). Subsequently, the video game processing server 10B fixes an arrangement position of each of the characters in the virtual space (Step S2-12); carries out a battle control in a state that the arrangement position is set to a fixed position (Step S13); and determines an action effect on the basis of the action of each character in the battle (Step S2-13).

On the other hand, the user terminal 20 carries out an output according to the received battle information (Step S14) and an output according to information (action effect information) indicating the determined action effect (Step S2-14).

As explained above, as one aspect of the second embodiment, the video game processing server 10B is configured so as to include: an arrangement position determining section 110; a battle control section 12; a mode setting section 13; an action effect determining section 14; and an arrangement position fixing section 15. Thus, the video game processing server 10B determines the action effect based on the action of each character in the battle; sets up the arrangement position of each character in the virtual space to the fixed position when the battle mode is set up to the second battle mode; and determines the action effect based on positional relationship information corresponding to the fixed position that is the specified arrangement position of each character. Therefore, it is possible to reduce a difference of game experience that may occur among a plurality of users between the case of generating a photographed image on the basis of the arrangement in the virtual space and the case of not generating it.

In this regard, in the example of the second embodiment described above, the case where the video game processing server 10B includes the various kinds of functions has been explained as an example. However, the video game processing system 100 may be configured so that the video game processing server 10B does not include a part or all of the various kinds of functions included in the video game processing server 10B, but the user terminal (for example, the user terminal 20) includes the part or all of the functions.

Further, in the second embodiment, the action effect includes various kinds of effects that can be generated by means of the action of the character. The action effect according to the present embodiment includes: a result generated by the character action (for example, an amount of decrease of the HP generated by the attack action); and a representation generated by the action of the character (for example, a representation using sound and an image generated by the attack action).

Further, in the second embodiment, the fixed position means a position that is never changed as a general rule. The fixed position according to the present embodiment is not changed until a predetermined condition (for example, termination of a battle) is satisfied, and is then changed when the predetermined condition is satisfied. Namely, for example, in a case where the battle mode is set up to the second battle mode, a coordinate in the virtual space is set up to the player character; the coordinate is not changed during progress of a battle; and the coordinate is initialized (for example, to a state that no coordinate is set up) in a case where the battle is terminated.

Third Embodiment

Figure 8:
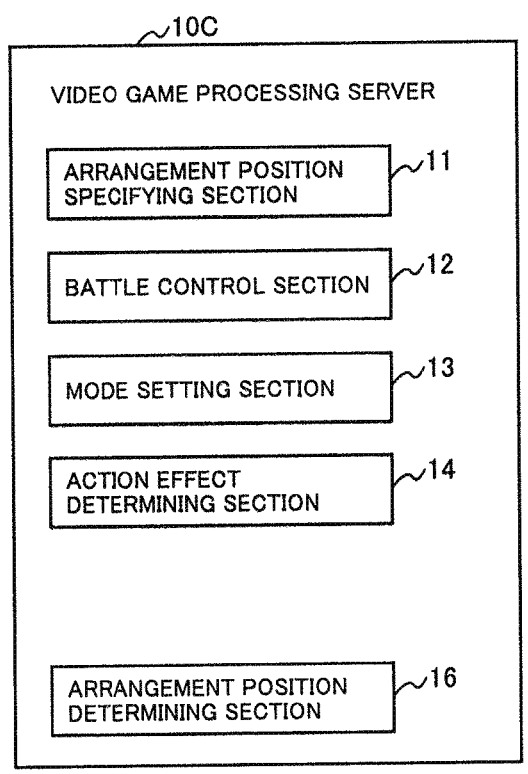
FIG. 8 is a block diagram showing a configuration of the video game processing server according to at least one embodiment of the present invention.

FIG. 8 is a block diagram showing a configuration of the video game processing server 10C that is an example of the video game processing server 10 according to one embodiment of the present invention. The video game processing server 10C at least includes: an arrangement position specifying section 11; a battle control section 12; a mode setting section 13; an action effect determining section 14; and an arrangement position determining section 16.

The action effect determining section 14 has a function to determine an action effect based on an action of each character in a battle.

The arrangement position determining section 16 has a function to determine that an arrangement position of each character in the virtual space is any one of a plurality of prescribed positions defined in advance in a case where the mode setting section 13 sets up the battle mode to the second battle mode. Further, in the present embodiment, the action effect determining section 14 has a function to determine an action effect based on the positional relationship information corresponding to any one prescribed position, at which the character is arranged, specified by the arrangement position specifying section 11.

Figure 9:
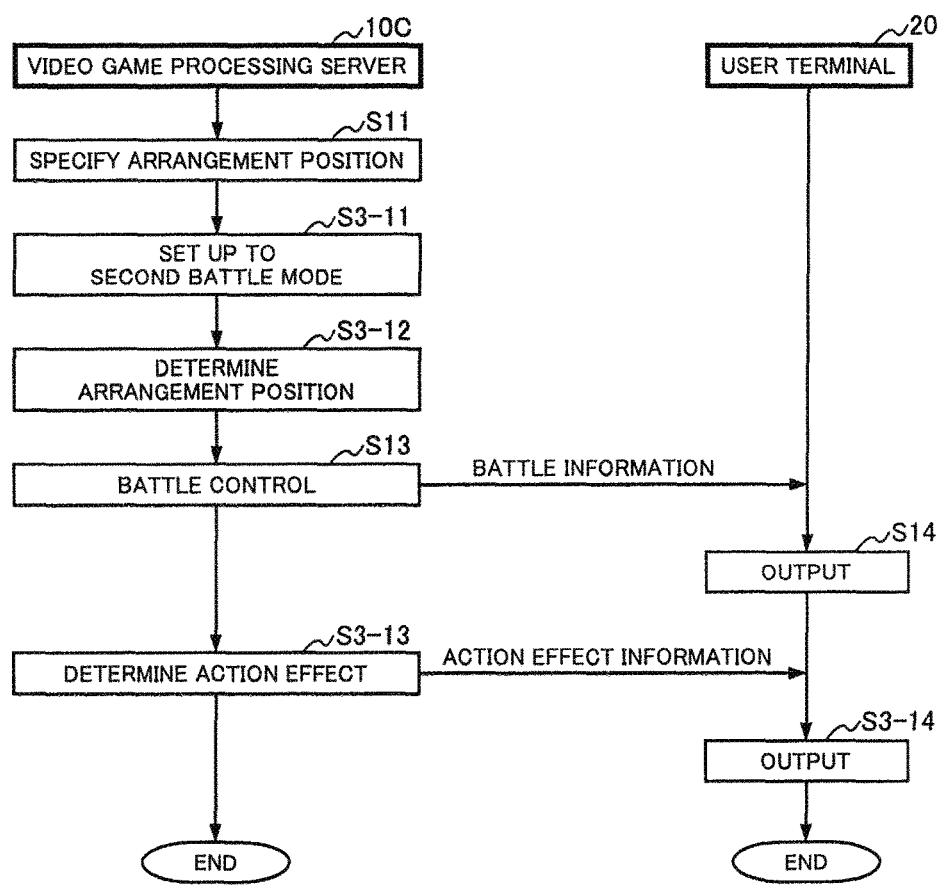
FIG. 9 is a flowchart showing an example of the game processing according to at least one embodiment of the present invention.

FIG. 9 is a flowchart showing an example of the game processing carried out by the video game processing system 100. Hereinafter, operations of the video game processing server 10C and the user terminal 20 will be described as an example. In this regard, explanation of a flowchart showing an operation of each of the video game processing server 10C and the user terminal 20 is omitted in view of avoidance of repeating explanation.

In the game processing according to the present embodiment, when the arrangement position is specified (Step S11), the video game processing server 100 sets up the battle mode to the second battle mode (Step S3-11). Subsequently, the video game processing server 10C determines that the position of each character in the virtual space is anyone of a plurality of prescribed positions defined in advance (Step S3-12); carries out a battle control in a state that the arrangement position is set to any one of the prescribed positions (Step S13); and determines an action effect on the basis of the action of each character in the battle (Step S3-13).

On the other hand, the user terminal 20 carries out an output according to the received battle information (Step S14) and an output according to the information indicating the determined action effect (that is, action effect information) (Step S3-14).

As explained above, as one aspect of the third embodiment, the video game processing server 100 is configured so as to include: the arrangement position determining section 110; the battle control section 12; the mode setting section 13; the action effect determining section 14; and the arrangement position determining section 16. Thus, the video game processing server 100 determines the action effect based on the action of each character in the battle; sets up the arrangement position of each character in the virtual space to any one of the plurality of prescribed positions when the battle mode is set up to the second battle mode; and determines the action effect based on the positional relationship information corresponding to any one prescribed position specified by the arrangement position specifying section, at which each character is arranged. Therefore, it is possible to reduce a difference of game experience that may occur among a plurality of users between the case of generating a photographed image on the basis of arrangement in the virtual space and the case of not generating it.

In this regard, although it has not been mentioned particularly in the example of the third embodiment described above, the video game processing server 10C may be configured so that the arrangement position determining section 16 has a function to change the arrangement position into other prescribed position in accordance with progress of the battle control. By configuring the video game processing server 10C in this manner, it is possible to provide variety to progress of the battle. In this case, the video game processing server 10C may be configured so that the arrangement position determining section 16 determines that the position of each character in the virtual space is set to one prescribed position defined in advance; and changes the arrangement position into another position in accordance with progress of the battle.

In this regard, in the example of the third embodiment described above, the case where the video game processing server 10C includes the various kinds of functions has been explained as an example. However, the video game processing system 100 may be configured so that the video game processing server 10C does not include apart or all of the various kinds of functions included in the video game processing server 10C, but the user terminal (for example, the user terminal 20) includes the part or all of the functions.

Fourth Embodiment

The video game processing server 10 (for example, the video game processing servers 10A, 10B and 10C according to other embodiments, more specifically, the mode setting section 13) may further include a function to set up any one battle mode of the first battle mode and the second battle mode in accordance with performance information of the video game processing apparatus (for example, the user terminal 20). Hereinafter, a video game processing server 10D provided with a mode setting section having this function will be described.

Here, as an example of the performance information, it is thought various kinds of information indicating an operation environment of the video game processing apparatus (for example, the user terminal 20), such as an OS, a kind of browser, a line speed and the like. In this regard, a method of acquiring the performance information by the video game processing server 10D is not limited particularly. For example, the video game processing server 10D may be configured so that the performance information is stored in a predetermined storage area that can be read out by the video game processing server 10D in processing independent of the game processing, or so that the performance information is transmitted from the user terminal 20 to the video game processing server 10D as preprocessing of the game processing.

Figure 10:
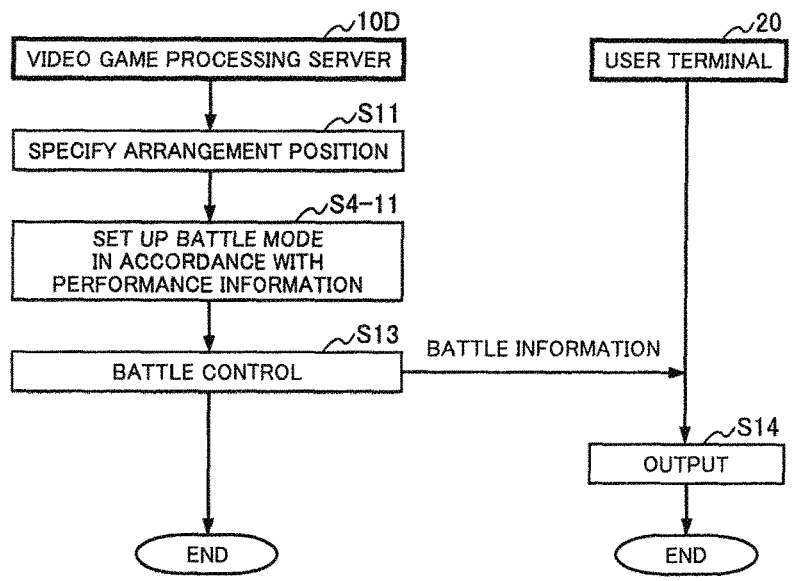
FIG. 10 is a flowchart showing an example of the game processing according to at least one embodiment of the present invention.

FIG. 10 is a flowchart showing an example of the game processing carried out by the video game processing system 100. Hereinafter, an operation of each of the video game processing server 10D and the user terminal 20 will be described as an example. In this regard, explanation of a flowchart showing an operation of each of the video game processing server 10D and the user terminal 20 is omitted in view of avoidance of repeating explanation.

In the game processing according to the present embodiment, when the arrangement position is specified (Step S11), the video game processing server 10D sets up any one battle mode of the first battle mode and the second battle mode in accordance with the performance information of the user terminal 20 (Step S4-11).

As explained above, as one aspect of the fourth embodiment, the video game processing server 10D is configured so as to include: the arrangement position specifying section 11; the battle control section 12; and the mode setting section 13. Therefore, it is possible to set up any one battle mode of the first battle mode and the second battle mode in accordance with the performance information of the video game processing apparatus (for example, the user terminal 20). This makes it possible for the user to play the video game in a mode suitable for the performance of the computer (for example, the user terminal 20) readily even in a case where a plurality of modes exists.

In this regard, in the example of the fourth embodiment described above, the case where the video game processing server 10D includes the various kinds of functions has been explained as an example. However, the video game processing system 100 may be configured so that the video game processing server 10D does not include apart or all of the various kinds of functions included in the video game processing server 10D, but the user terminal (for example, the user terminal 20) includes the part or all of the functions.

Fifth Embodiment

The video game processing server 10 (for example, the video game processing servers 10A, 10B, and 10C according to the other embodiments; more specifically, the mode setting section 13) may further have a function to set up any one battle mode of the first battle mode and the second battle mode in response to a setup operation by a player. Hereinafter, a video game processing server 10E provided with a mode setting section having this function will be described.

Here, as an example of the setup operation, it is thought a selection operation by the player toward a game screen on which the first battle mode and the second battle mode are selectably displayed. In this regard, timing that the video game processing server 10E receives the "setup operation by the player" used to set up a battle mode is not limited particularly. For example, the video game processing system 100 may be configured so that the video game processing server 10E receives it at arbitrary timing before the game processing is started. Alternatively, the video game processing system 100 may be configured so that the video game processing server 10E receives a setup operation from the user terminal 20 in the game processing.

Figure 11:
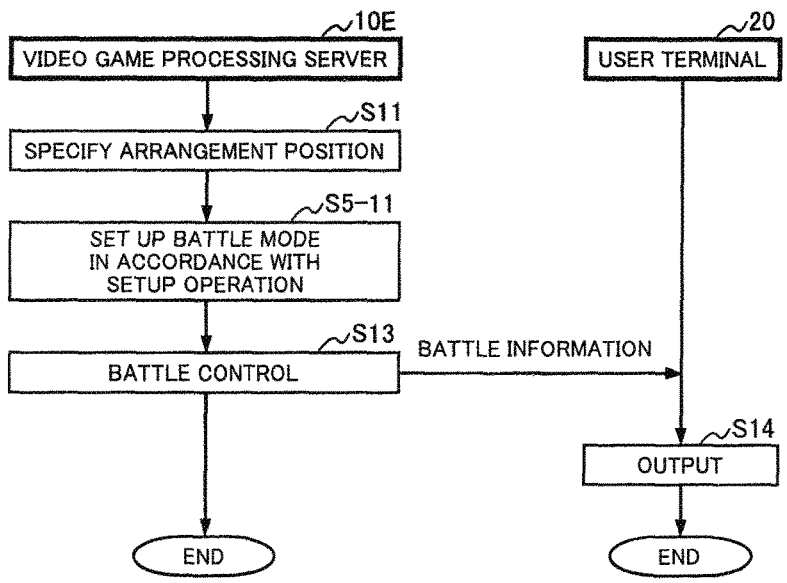
FIG. 11 is a flowchart showing an example of the game processing according to at least one embodiment of the present invention.

FIG. 11 is a flowchart showing an example of the game processing carried out by the video game processing system 100. Hereinafter, an operation of each of the video game processing server 10E and the user terminal 20 will be described as an example. In this regard, explanation of a flowchart showing an operation of each of the video game processing server 10E and the user terminal 20 is omitted in view of avoidance of repeating explanation.

In the game processing according to the present embodiment, when the arrangement position is specified (Step S11), the video game processing server 10E sets up any one battle mode of the first battle mode and the second battle mode in response to a setup operation by the player of the user terminal 20 (Step S5-11).

As explained above, as one aspect of the fifth embodiment, the video game processing server 10E is configured so as to include: the arrangement position specifying section 11; the battle control section 12; and the mode setting section 13. Thus, the video game processing server 10E sets up any one battle mode of the first battle mode and the second battle mode in response to a setup operation of the player (for example, the user of the user terminal 20). Therefore, it is possible to cause the player to play the video game in a mode according to desire of the player.

In this regard, in the example of the fifth embodiment described above, the case where the video game processing server 10E includes the various kinds of functions has been explained as an example. However, the video game processing system 100 may be configured so that the video game processing server 10E does not include a part or all of the various kinds of functions included in the video game processing server 10E, but the user terminal (for example, the user terminal 20) includes the part or all of the functions.

Sixth Embodiment

Figure 12:
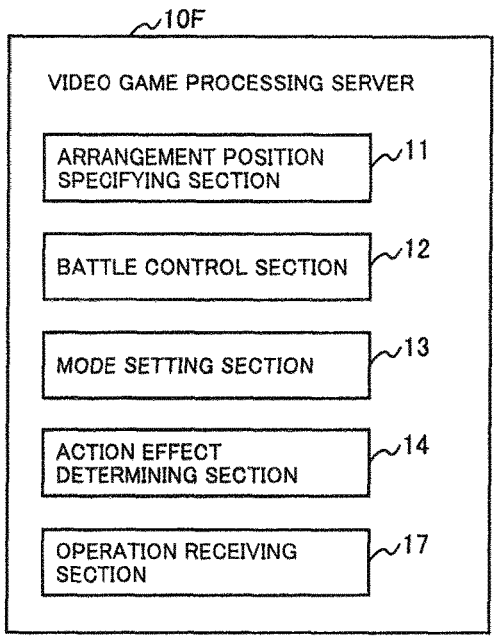
FIG. 12 is a block diagram showing a configuration of the video game processing server according to at least one embodiment of the present invention.

FIG. 12 is a block diagram showing a configuration of a video game processing server 10F according to one embodiment of the present invention. The video game processing server 10F at least includes: an arrangement position specifying section 11; a battle control section 12; a mode setting section 13; and an operation receiving section 17. Here, the first battle mode and the second battle mode according to the embodiments described above will be described more specifically.

The arrangement position specifying section 11 specifies a coordinate of each of various kinds of characters in a three-dimensional virtual space in accordance with progress of the video game.

The battle control section 12 carries out a battle control in a battle mode set up by the mode setting section 13.

The mode setting section 13 sets up the determined mode in a specific setup rule.

The operation receiving section 17 has a function to receive various kinds of operational inputs by the player (for example, the user of the user terminal 20). In the present embodiment, the operation receiving section 17 receives various kinds of operations inputted via an operating section (a mouse, a keyboard or a touch panel) included in the user terminal 20 to the user terminal 20.

Figure 13:
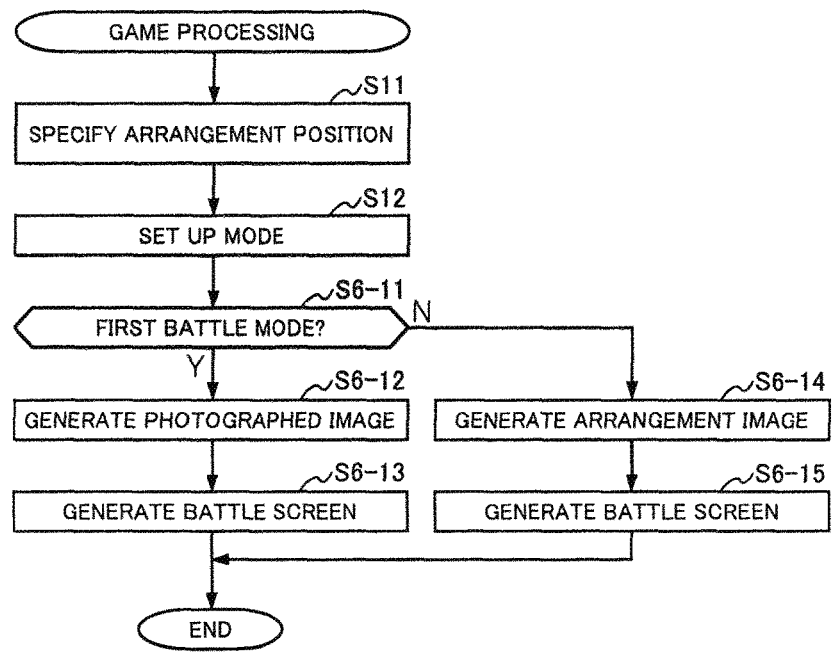
FIG. 13 is a flowchart showing an example of the game processing according to at least one embodiment of the present invention.

FIG. 13 is a flowchart showing an example of the game processing carried out by the video game processing server 10F. In the game processing according to the present embodiment, when the mode is set up (Step S12), the video game processing server 10F determines whether the mode thus set up is the first battle mode or not (Step S6-11).

Here, in a case where it is determined that the mode thus setup is the first battle mode ("Yes" at Step S6-11), the video game processing server 10F generates a photographed image (Step S6-12). In the present embodiment, the video game processing server 10F generates the photographed image by carrying out rendering on the basis of information of various kinds of objects (including characters) arranged in the virtual space (for example, coordinate information). In this regard, a dimension of the virtual space is not limited particularly.

When the photographed image is generated, the video game processing server 10F generates a battle screen including a photographed image (Step S6-13). In the present embodiment, the video game processing server 10F generates a battle screen that includes a photographed image and an image for predetermined play (for example, an image showing a status of each character or an image for urging the player to carry out a predetermined operation in accordance with a progress status of the battle).

On the other hand, in a case where it is determined that the mode thus set up is not the first battle mode because the battle mode is set up to the second battle mode ("No" at Step S6-11), the video game processing server 10F generates an arrangement image (Step S6-14). In the present embodiment, the video game processing server 10F does not carry out rendering based on information of various kinds of objects arranged in the virtual space, but generates the arrangement image in which each character is arranged at a predetermined position (for example, positions at which a position of the player character and a position of other character are defined in advance) on the basis of specific information (for example, image information of each character arranged in the virtual space).

When the arrangement image is generated, the video game processing server 10F generates a battle screen including an arrangement image (Step S6-15). In the present embodiment, the video game processing server 10F generates the battle screen including the arrangement image and an image for predetermined play (for example, an image showing a status of each character or an image for urging the player to carry out a predetermined operation in accordance with a progress status of the battle).

As explained above, as one aspect of the sixth embodiment, the video game processing server 10F is configured so as to include: the arrangement position specifying section 11; the battle control section 12; the mode setting section 13; and the operation receiving section 17. Thus, the video game processing server 10F specifies the coordinate of each character in the three-dimensional virtual space in accordance with progress of the video game; carries out the battle control in the first battle mode, in which the photographed image of the three-dimensional virtual space photographed by the virtual camera is displayed on the battle screen, or the second battle mode, in which the arrangement image, in which each of the plurality of characters is arranged at a predetermined position with no relationship with the arrangement position of the corresponding character in the three-dimensional virtual space, is displayed on the battle screen; sets the battle mode to any one mode of the first battle mode and the second battle mode; and carries out the battle control in the battle mode thus set up. Therefore, it is possible to reduce a difference that may occur in game experience of each of a plurality of users.

Namely, by providing a plurality of modes that has a difference in terms of whether to photograph by the virtual camera (that is, presence or absence of rendering), it is possible for a plurality of users to select a mode suitable for the corresponding user. In addition, it becomes possible to realize the video game in which it is common to use arrangement in the virtual space. As a result, it is possible to make a difference of game experience, which the player can feel by playing the two modes, smaller.

In this regard, in the example of the sixth embodiment described above, the case where the video game processing server 10F includes the various kinds of functions has been explained as an example. However, the video game processing system 100 may be configured so that the video game processing server 10F does not include apart or all of the various kinds of functions included in the video game processing server 10F, but the user terminal (for example, the user terminal 20) includes the part or all of the functions.

In this regard, although it has not been mentioned particularly in the example of the six embodiment described above, the video game processing server 10F may be configured so as to use a common image both in the first battle mode and in the second battle mode as an image for predetermined play. By configuring the video game processing system 100 in this manner, it is possible to make a difference of game experience applied to the player by the first battle mode and the second battle mode smaller.

In this regard, although it has not been mentioned particularly in the example of the six embodiment described above, the video game processing server 10F may be configured so as to use an image according to a property of each mode as an image for predetermined play. In this case, the video game processing system 100 may be configured so that an "image associated with the character position in the photographed image displayed on the battle screen" is used in accordance with a characteristic that includes an "image in which characters arranged in the virtual space are photographed" in the first battle mode as the image according to the property of each mode, for example. Namely, the video game processing server 10F may be configured so as to use an image (as a concrete example, an HP gauge indicating a remaining HP of an enemy character) that is arranged at the left side when an enemy character is displayed at the left side on the battle screen or is arranged at the right side when the enemy character is displayed at the left side on the battle screen, for example.

Seventh Embodiment

Figure 14:
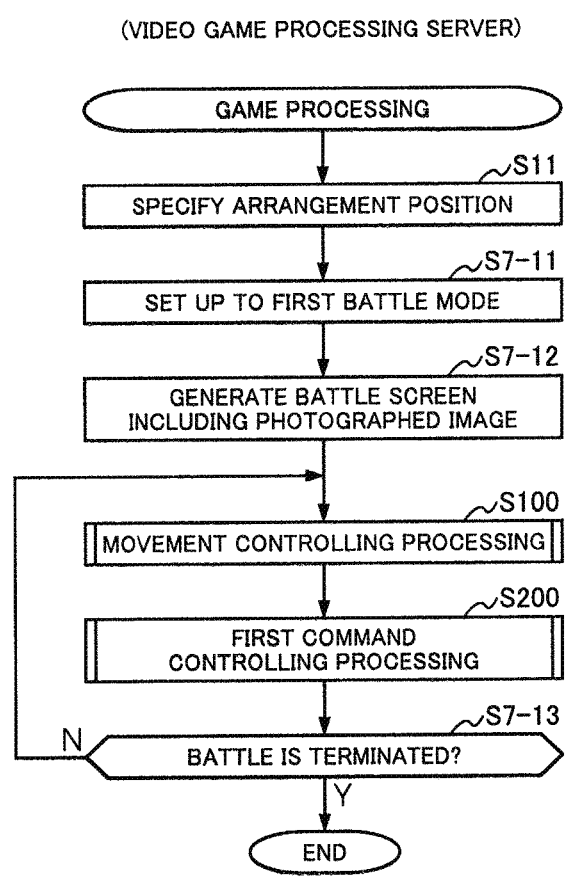
FIG. 14 is a flowchart showing an example of the game processing according to at least one embodiment of the present invention.

FIG. 14 is a flowchart showing an example of the game processing carried out by the video game processing server 10 according to one embodiment of the present invention. Here, the first battle mode will be described more specifically.

In the game processing according to the present embodiment, when the arrangement position is specified (Step S11), the video game processing server 10 sets up the battle mode to the first battle mode (Step S7-11). Subsequently, the video game processing server 10 generates a battle screen including a photographed image (Step S7-12).

When the battle screen is generated, the video game processing server 10 carries out processing to control movement of the character (movement controlling processing)

(Step S100). The movement controlling processing according to the present embodiment will be described later in detail (see FIG. 15).

When the movement controlling processing is carried out (Step S100), the video game processing server 10 carries out processing to control selection of a command by a player and execution of the command by a player character (or processing to cause the user terminal to control) (first command controlling processing) (Step S200). The first command controlling processing according to the present embodiment will be described later in detail (see FIG. 16).

When the first command controlling processing is carried out (Step S200), the video game processing server 10 determines whether the battle is terminated or not (Step S7-13). Here, in a case where it is determined that the battle is not terminated because a predetermined battle terminated condition is not satisfied ("No" at Step S7-13), the video game processing server 10 causes the processing flow to proceed to the process at Step S100. On the other hand, in a case where it is determined that the battle is terminated because the predetermined battle terminated condition is satisfied ("Yes" at Step S7-13), the video game processing server 10 terminates the processing herein.

Figure 15:
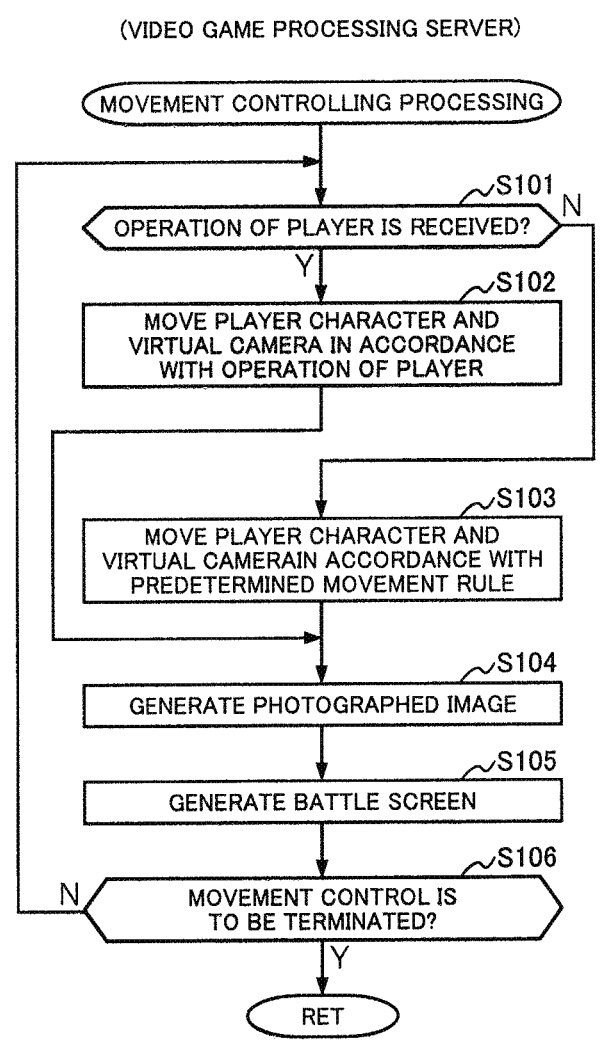
FIG. 15 is a flowchart showing an example of movement controlling processing according to at least one embodiment of the present invention.

FIG. 15 is a flowchart showing an example of the movement controlling processing carried out by the video game processing server 10. Here, the case where the video game processing server 10 generates the photographed image in response to movement of the player character will be described as an example. In this regard, the video game processing server 10 receives an operation of the player via the user terminal 20.

In the movement controlling processing, the video game processing server 10 first determines whether an operation of the player is received or not (Step S101). Here, in a case where it is determined that the operation of the player is received because a predetermined movement operation is received ("Yes" at Step S101), the video game processing server 10 moves the player character and the virtual camera in accordance with the operation of the player (Step S102).

On the other hand, in a case where it is determined, in the process at Step S101, that an operation of the player is not received, for example, because a predetermined time elapses since the operation was received finally ("No" at Step S101), the video game processing server 10 moves the player character and the virtual camera in accordance with a predetermined movement rule (Step S103). In this regard, since a known art is used for the method of controlling movement of the character in accordance with the predetermined movement rule, detailed explanation herein is omitted.

When the player character and the virtual camera is moved, the video game processing server 10 generates a photographed image (Step S104).

When the photographed image is generated, the video game processing server 10 generates a battle screen including the generated photographed image (Step S105).

When the battle screen is generated, the video game processing server 10 determines whether the movement control is to be terminated or not (Step S106). Here, in a case where it is determined that the movement control is not to be terminated ("No" at Step S106), the video game processing server 10 causes the processing flow to proceed to the process at Step S101. On the other hand, in a case where it is determined that the movement control is to be terminated, for example, because a start condition for other processing related to progress of the video game (for example, processing to control execution of the command by the character) is satisfied ("Yes" at Step S106), the video game processing server 10 terminates the processing herein, and causes the processing flow to proceed to the process at Step S200 in the game processing (see FIG. 14).

Figure 16:
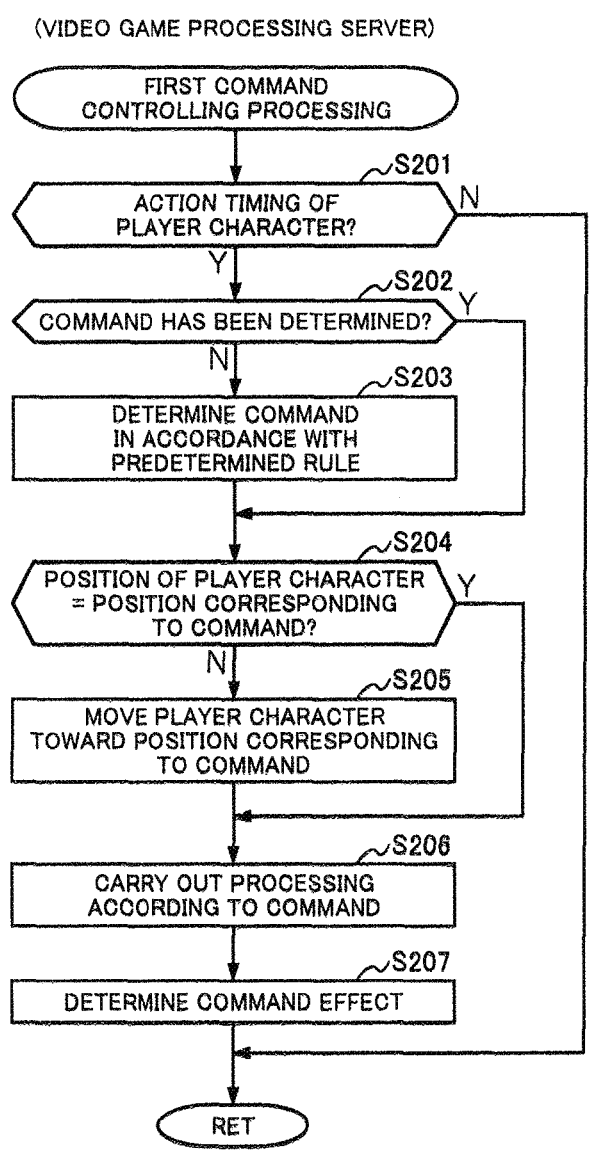
FIG. 16 is a flowchart showing an example of first command controlling processing according to at least one embodiment of the present invention.

FIG. 16 is a flowchart showing an example of the first command controlling processing carried out by the video game processing server 10. Here, the case where an action (excluding movement) of the player character is controlled by a command selected in accordance with the command selected by the player or a predetermined rule will be described as an example. In this regard, the video game processing server 10 receives an operation of the player via the user terminal 20.

In the first command controlling processing, the video game processing server 10 first determines whether it is action timing of the player character or not (Step S201). Here, in a case where it is determined that it is not the action timing of the player character, for example, because an action value corresponding to the player character does not accumulate to a predetermined amount ("No" at Step S201), the video game processing server 10 terminates the processing herein, and causes the processing flow to proceed to the process at Step S7-13 in the game processing.

On the other hand, in a case where the action value corresponding to the player character accumulates to the predetermined amount, for example, because the predetermined time elapses after the action of the player character, the video game processing server 10 determines that it is the action timing of the player character ("Yes" at Step S201), and determines whether a command has been determined or not (Step S202). In the present embodiment, the user terminal 20 may determine the action that the player character is caused to carry out at the action timing on the basis of an operation of the player in spite of whether it is the action timing or not. Here, in a case where it is determined that the command has been determined, for example, because the command selection operation by the player has already been received ("Yes" at Step S202), the video game processing server 10 causes the processing flow to proceed to the process at Step S204 (will be described later).

On the other hand, in a case where it is determined that the command has not been determined, for example, because a command corresponding to the player character is set up in a predetermined storage area ("No" at Step S202), the video game processing server 10 determines a command in accordance with a predetermined rule (Step S203). In the present embodiment, the video game processing server 10 determines a command that the player character is caused to carry out on the basis of strategy set up to a party including the player character.

After it becomes a state that the command is determined, the video game processing server 10 determines whether the position of the player character is a position corresponding to the determined command or not (Step S204). In the present embodiment, there are plural kinds of commands each of which can be set up to the player character. Each of the plural kinds of commands is associated with any one of a "long distance", a "middle distance" and a "short distance (close range)". The video game processing server 10 determines whether the position of the player character is the position corresponding to the command or not on the basis of the position of the player character and the position of the character (action target character) that becomes an execution target (for example, an attack target in the case of an attack) of an action indicated by the command. Here, in a case where it is determined that the position of the player character is the position corresponding to the command ("Yes" at Step S204), the video game processing server 10 causes the processing flow to proceed to a process at Step S206 (will be described later).

On the other hand, in a case where it is determined that the position of the player character is not the position corresponding to the command ("No" at Step S204), the video game processing server 10 moves the player character toward the position corresponding to the command (Step S205). In the present embodiment, the video game processing server 10 derives the shortest route through which the position of the player character becomes the position corresponding to the command, and controls the movement of the player character so as to move on the derived shortest route. Namely, for example, in a case where a distance corresponding to the determined command is a "short distance" and a distance between the position of the player character and the position of the action target character exceeds the distance corresponding to the "short distance", the video game processing server 10 moves the player character toward the position of the action target character. In this regard, the video game processing server 10 may be configured so as to receive an operation of the player at this time and to control movement of the player character. In this case, the video game processing server 10 may be configured so as to receive a change operation of the command until the position of the player character reaches (or becomes) the position corresponding to the command.

After the position of the player character becomes the position corresponding to the command, the video game processing server 10 carries out processing according to the command (Step S206). In the present embodiment, the video game processing server 10 generates a game screen according to the command (for example, a screen indicating an execution process of an attack or a recovery magic by the player character), and causes a display device to display the generated game screen.

When the processing according to the command is carried out, the video game processing server 10 determines an effect (command effect; for example, a size of an HP reduction amount generated by an attack, a size of an HP recovery amount generated by a recovery magic) that is given to the progress of the video game on the basis of the fact that the processing according to the command is carried out (Step S207), and causes the processing flow to proceed to the process at Step S7-13 in the game processing. In the present embodiment, the user terminal 20 may be configured so that the shorter the distance from the character that carries out the action (action executing character) to the action target character is, the larger the command effect becomes.

As explained above, as one aspect of the seventh embodiment, the video game processing server 10 specifies the arrangement position of at least one character in the virtual space in accordance with progress of the video game; sets up the first battle mode; and carries out a battle control in the first battle mode in which the photographed image of the virtual space photographed by the virtual camera is displayed on the battle screen (more specifically, carries out generation of the battle screen, the movement controlling processing, the first command controlling processing, and battle determining processing). Therefore, it is possible to improve interest of the player in the video game in the range that the difference of game experience applied to the player does not become excessive compared with "the second battle mode in which no photographed image is generated on the basis of the arrangement in the virtual space".

Namely, the first battle mode and the second battle mode correspond with each other in terms of "usage of the arrangement position in the virtual space". Therefore, it is possible to reduce a difference of game experience between the first battle mode and the second battle mode, which may occur due to whether the photographed image is used or not.

In this regard, in the example of the second embodiment described above, the case where the video game processing server 10 includes the various kinds of functions has been explained as an example. However, the video game processing system 100 may be configured so that the video game processing server 10 does not include a part or all of the various kinds of functions included in the video game processing server 10, but the user terminal (for example, the user terminal 20) includes the part or all of the functions.

Eighth Embodiment

Figure 17:
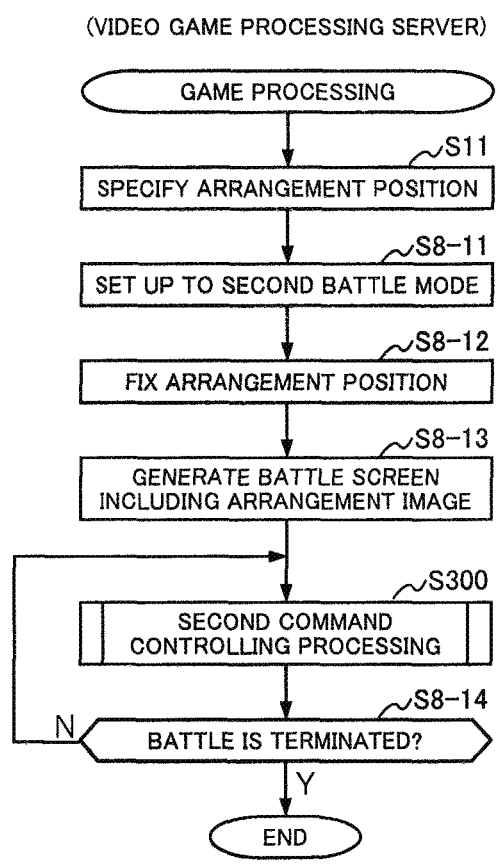
FIG. 17 is a flowchart showing an example of the game processing according to at least one embodiment of the present invention.

FIG. 17 is a flowchart showing an example of the game processing carried out by the video game processing server 10 according to one embodiment of the present invention. Here, the second battle mode will be described more specifically.

In the game processing according to the present embodiment, when the arrangement position is specified (Step S11), the video game processing server 10 sets up the battle mode to the second battle mode (Step S8-11). Subsequently, the video game processing server 10 fixes an arrangement position of each character in the virtual space (Step S8-12), and generates a battle screen including an arrangement image (Step S8-13).

When the battle screen is generated, the video game processing server 10 carries out processing (second command controlling processing) to control selection of a command by the player and execution of the command by the player character (or to cause the user terminal to control) (Step S300). The second command controlling processing according to the present embodiment will be described later in detail (see FIG. 18).

When the second command controlling processing is carried out (Step S300), the video game processing server 10 determines whether the battle is terminated or not (Step S8-14). Here, in a case where it is determined that the battle is not terminated because a predetermined battle terminated condition is not satisfied ("No" at Step S8-14), the video game processing server 10 causes the processing flow to proceed to the process at Step S300. On the other hand, in a case where it is determined that the battle is terminated because the predetermined battle terminated condition is satisfied ("Yes" at Step S8-14), the video game processing server 10 terminates the processing herein.

Figure 18:
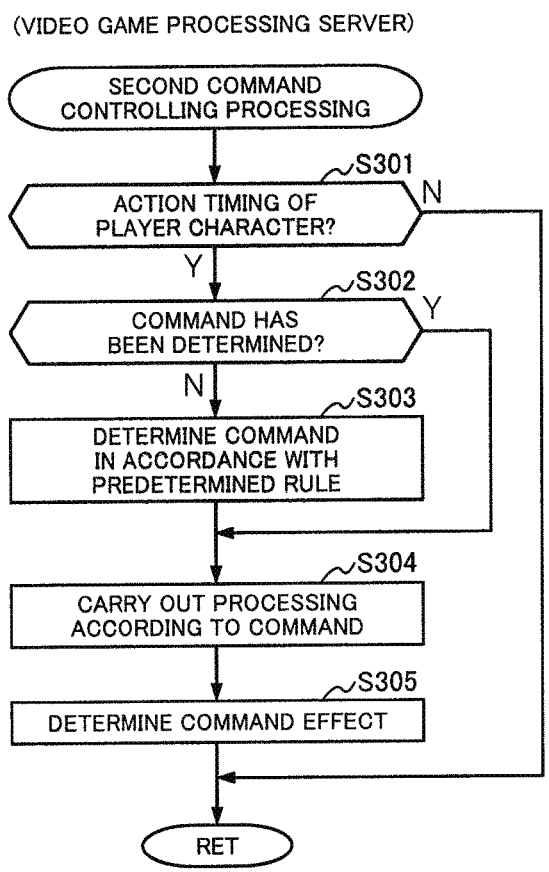
FIG. 18 is a flowchart showing an example of second command controlling processing according to at least one embodiment of the present invention.

FIG. 18 is a flowchart showing an example of the second command controlling processing carried out by the video game processing server 10. Here, the case where an action (excluding movement) of the player character is controlled by a command selected in accordance with the command selected by the player or a predetermined rule will be described as an example. In this regard, the video game processing server 10 receives an operation of the player via the user terminal 20.

In the second command controlling processing, the video game processing server 10 first determines whether it is action timing of the player character or not (Step S301). Here, in a case where it is determined that it is not action timing of the player character, for example, because the action value according to the player character does not accumulate to the predetermined amount ("No" at Step S301), the video game processing server 10 terminates the processing herein, and causes the processing flow to proceed to the process at Step S8-14 in the game processing (see FIG. 17).

On the other hand, for example, in a case where the action value corresponding to the player character accumulates to the predetermined amount because the predetermined time elapses after the action of the player character, the video game processing server 10 determines that it is the action timing of the player character ("Yes" at Step S301), and determines whether a command has been determined or not (Step S302). In the present embodiment, the video game processing server 10 may determine an action to cause the player character to carry out when it becomes the action timing on the basis of an operation of the player in spite of whether it is the action timing or not. Here, in a case where it is determined that the command has been determined, for example, because a command selection operation by the player has already been received ("Yes" at Step S302), the video game processing server 10 causes the processing flow to proceed to a process at Step S304 (will be described later).

On the other hand, in a case where it is determined that the command has not been determined, for example, because a command corresponding to the player character is not set up in a predetermined storage area ("No" at Step S302), the video game processing server 10 determines a command in accordance with a predetermined rule (Step S303). In the present embodiment, the video game processing server 10 determines a command that the player character is caused to carry out on the basis of strategy set up to the party including the player character. In this regard, in the present embodiment, since the arrangement position of each character in the three-dimensional virtual space is fixed, the video game processing server 10 restricts a command that can be set up to the player character on the basis of a distance between the respective characters in the three-dimensional virtual space.

The video game processing server 10 carries out processing according to the command after it becomes a state that the command is determined (Step S304). In the present embodiment, the video game processing server 10 generates a game screen according to the command (for example, a screen showing an execution process of an attack or a recovery magic by the player character), and sets up the generated game screen to a battle screen. In this regard, the battle screen generated by the video game processing server 10 is transmitted to the user terminal 20, and displayed on the display screen of the display device included in the user terminal 20.

When the processing according to the command is carried out, the video game processing server 10 determines an effect (command effect) given to progress of the video game on the basis of the fact that the processing according to the command is carried out (Step S305), and causes the processing flow to proceed to the process at Step S8-14 in the game processing. In the present embodiment, the video game processing server 10 may be configured so that the shorter the distance from the character that carries out the action (action executing character) to the action target character is, the larger the command effect becomes.

As explained above, as one aspect of the eighth embodiment, the video game processing server 10 is configured so as to: set up (or fix) the arrangement position of each character in the virtual space to the fixed position when the battle mode is set up to the second battle mode; and determines the action effect based on positional relationship information corresponding to the fixed position that is the specified arrangement position of each character (more specifically, determines the command effect by the second command controlling processing). Therefore, it is possible to reduce a difference of game experience that may occur among a plurality of users between the case of generating a photographed image on the basis of the arrangement in the virtual space and the case of not generating it.

Further, in a case where the battle mode is set up to the second battle mode at Step S303 in FIG. 18, the video game processing server 10 may also be configured so as to ignore a distance associated with each command (that is, a distance as an execution condition of the command). Thus, even in a case where an arrangement position of a character in the three-dimensional virtual space is fixed, parameters other than the distance associated with each command are treated in the same manner as the first battle mode. This makes it possible to further reduce the difference of game experience that may occur among a plurality of users between the case of generating a photographed image on the basis of the arrangement in the virtual space and the case of not generating it.

In this regard, in the example of the eighth embodiment described above, the case where the video game processing server 10 includes the various kinds of functions has been explained as an example. However, the video game processing system 100 may be configured so that the video game processing server 10 does not include a part or all of the various kinds of functions included in the video game processing server 10, but the user terminal (for example, the user terminal 20) includes the part or all of the functions.

Ninth Embodiment

Figure 19:
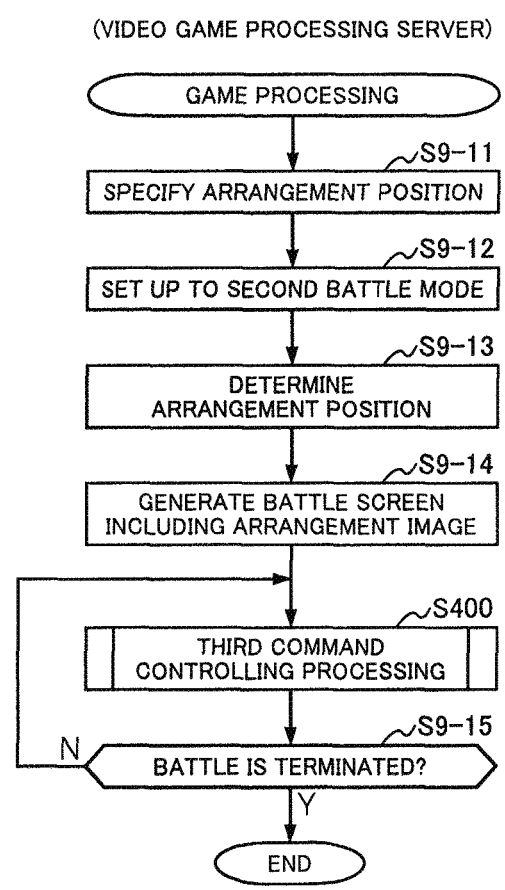
FIG. 19 is a flowchart showing an example of the game processing according to at least one embodiment of the present invention.

FIG. 19 is a flowchart showing an example of the game processing carried out by the video game processing server 10 according to one embodiment of the present invention. Here, the prescribed position in the second battle mode will be described more specifically.

In the game processing according to the present embodiment, the video game processing server 10 first specifies an arrangement position (Step S9-11). In the present embodiment, the video game processing server 10 specifies a coordinate indicating the virtual space in response to an operation of the player as an arrangement position. In this regard, the video game processing server 10 may be configured so that the processing to specify the arrangement position before the mode is set up is omitted.

When the arrangement position is specified, the video game processing server 10 sets up the battle mode to the second battle mode (Step S9-12). Subsequently, the video game processing server 10 determines that the arrangement position of each character in the virtual space is anyone of a plurality of prescribed positions defined in advance (Step S9-13).

When the arrangement position of each of the characters is determined, the video game processing server 10 generates a battle screen including an arrangement image (Step S9-14). In the present embodiment, the video game processing server 10 generates a battle screen including an arrangement image in which an image corresponding to each character is arranged at a predetermined position with no relationship with the arrangement position of the corresponding character in the virtual space. Namely, in the second battle mode according to the present embodiment, the video game processing server 10 does not photograph the virtual space by means of the virtual camera.

When the battle screen is generated, the video game processing server 10 carries out processing to control selection of a command by the player, execution of the command by the player character and a change in the arrangement positions of each character (or processing to cause the user terminal to control them) (third command controlling processing) (Step S400). The third command controlling processing according to the present embodiment will be described later in detail (see FIG. 20).

When the third command controlling processing is carried out (Step S400), the video game processing server 10 determines whether the battle is terminated or not (Step S9-15). Here, in a case where it is determined that the battle is not terminated because a predetermined battle terminated condition is not satisfied ("No" at Step S9-15), the video game processing server 10 causes the processing flow to proceed to the process at Step S400. On the other hand, in a case where it is determined that the battle is terminated because the predetermined battle terminated condition is satisfied ("Yes" at Step S9-15), the video game processing server 10 terminates the processing herein.

Figure 20:
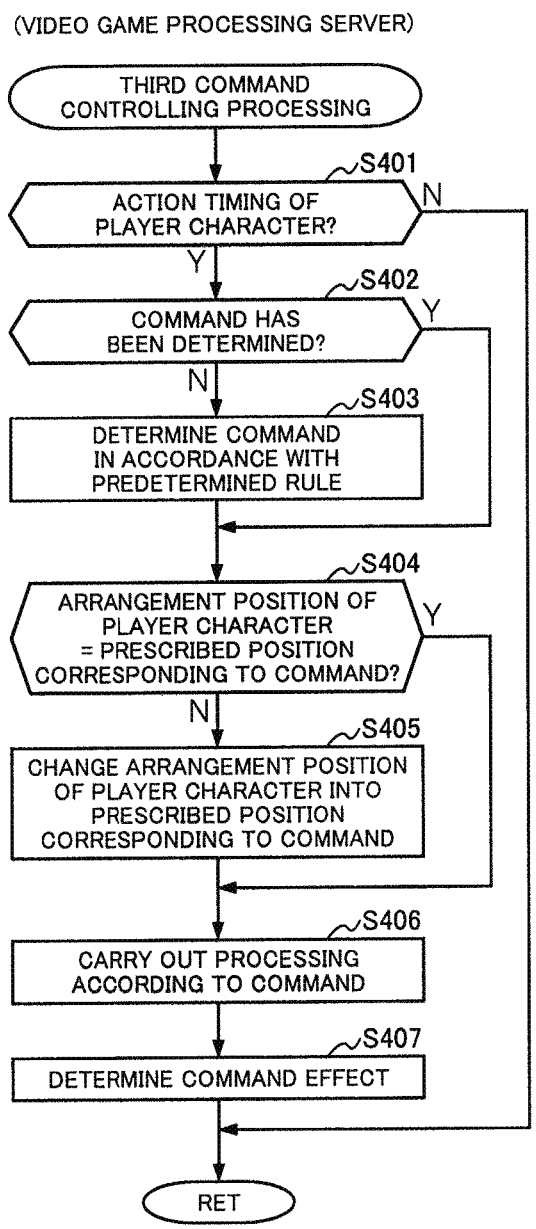
FIG. 20 is a flowchart showing an example of third command controlling processing according to at least one embodiment of the present invention.

FIG. 20 is a flowchart showing an example of the third command controlling processing carried out by the video game processing server 10. Here, the case where an arrangement position of the player character is changed by a command selected in accordance with a command selected by the player or a predetermined rule will be described as an example. In this regard, the video game processing server 10 receives an operation of the player via the user terminal 20.

In the third command controlling processing, the video game processing server 10 first determines whether it is action timing of the player character or not (Step S401). Here, in a case where it is determined that it is not the action timing of the player character, for example, because an action value corresponding to the player character does not accumulate to a predetermined amount ("No" at Step S401), the video game processing server 10 terminates the processing herein, and causes the processing flow to proceed to the process at Step S9-15 in the game processing.

On the other hand, for example, in a case where the action value corresponding to the player character accumulates to the predetermined amount because the predetermined time elapses after the action of the player character, the video game processing server 10 determines that it is the action timing of the player character ("Yes" at Step S401), and determines whether the command has been determined or not (Step S402). Here, in a case where it is determined that the command has been determined, for example, because a command selection operation by the player has already been received ("Yes" at Step S402), the video game processing server 10 causes the processing flow to proceed to a process at Step S404 (will be described later).

On the other hand, in a case where it is determined that the command has not been determined, for example, because a command corresponding to the player character is not set up in a predetermined storage area ("No" at Step S402), the video game processing server 10 determines a command in accordance with a predetermined rule (Step S403).

After it becomes a state that the command is determined, the video game processing server 10 determines whether the position of the player character is a position corresponding to the determined command or not (Step S404). In the present embodiment, there are plural kinds of commands each of which can be set up to the player character. Each of the plural kinds of commands is associated with any one of a plurality of prescribed positions (for example, any one of the "long distance", the "middle distance" and the "short distance"). The video game processing server 10 determines whether the position of the player character is the prescribed position corresponding to the command or not on the basis of the position of the player character and the position of the character (action target character) that becomes an execution target (for example, an attack target in the case of an attack) of an action indicated by the command. Here, in a case where it is determined that the position of the player character is the prescribed position corresponding to the command ("Yes" at Step S404), the video game processing server 10 causes the processing flow to proceed to a process at Step S406 (will be described later).

On the other hand, in a case where it is determined that the position of the player character is not the prescribed position corresponding to the command ("No" at Step S404), the video game processing server 10 changes the arrangement position of the player character in the virtual space into the prescribed position corresponding to the command (Step S405). In the present embodiment, the video game processing server 10 changes the coordinate of the player character, thereby carrying out the change of the arrangement position.

After the position of the player character becomes the prescribed position corresponding to the command, the video game processing server 10 carries out processing according to the command (Step S406).

When the processing according to the command is carried out, the video game processing server 10 determines an effect (command effect) given to progress of the video game on the basis of the fact that the processing according to the command is carried out (Step S407), and causes the processing flow to proceed to the process at Step S9-15 in the game processing. In the present embodiment, the video game processing server 10 may be configured so that the shorter the distance from the arrangement position (that is, any one of the prescribed positions) of the character (the action executing character) that carries out the action to the action target character is, the larger the command effect becomes.

As explained above, as one aspect of the ninth embodiment, the video game processing server 10 determines the action effect based on the action of each character in the battle; sets up the arrangement position of each character in the virtual space to any one of the plurality of prescribed positions when the battle mode is set up to the second battle mode; and determines the action effect based on the positional relationship information corresponding to any one prescribed position specified by the arrangement position specifying section, at which each character is arranged (more specifically, determines the command effect by the third command controlling processing). Therefore, it is possible to reduce a difference of game experience that may occur among a plurality of users between the case of generating a photographed image on the basis of arrangement in the virtual space and the case of not generating it.

Further, in a case where the battle mode is set to the second battle mode at Step S9-14 in FIG. 19, the video game processing server 10 may be configured so as to photograph the virtual space by the virtual camera and generate a battle screen including a photographed image and an arrangement image. In this case, it is preferable that a processing load and a communication load at the setup of the second battle mode become lower than the case where the battle mode is set up to the first battle mode by narrowing a photographed range by the virtual camera compared with the first battle mode, or making resolution of the photographed image lower compared with the first battle mode, for example. By configuring the video game processing system 100 in this manner, it is possible to further reduce the difference of game experience that may occur between the case of playing the video game in the first battle mode and the case of playing the video game in the second battle mode.

In this regard, the video game processing system 100 may be configured so that the video game processing server 10 generates the battle screen including the photographed image and the arrangement image in a case where the battle mode is set up to the first battle mode.

In this regard, in the example of the ninth embodiment described above, the case where the video game processing server 10 includes the various kinds of functions has been explained as an example. However, the video game processing system 100 may be configured so that the video game processing server 10 does not include a part or all of the various kinds of functions included in the video game processing server 10, but the user terminal (for example, the user terminal 20) includes the part or all of the functions.

Tenth Embodiment

Figure 21:
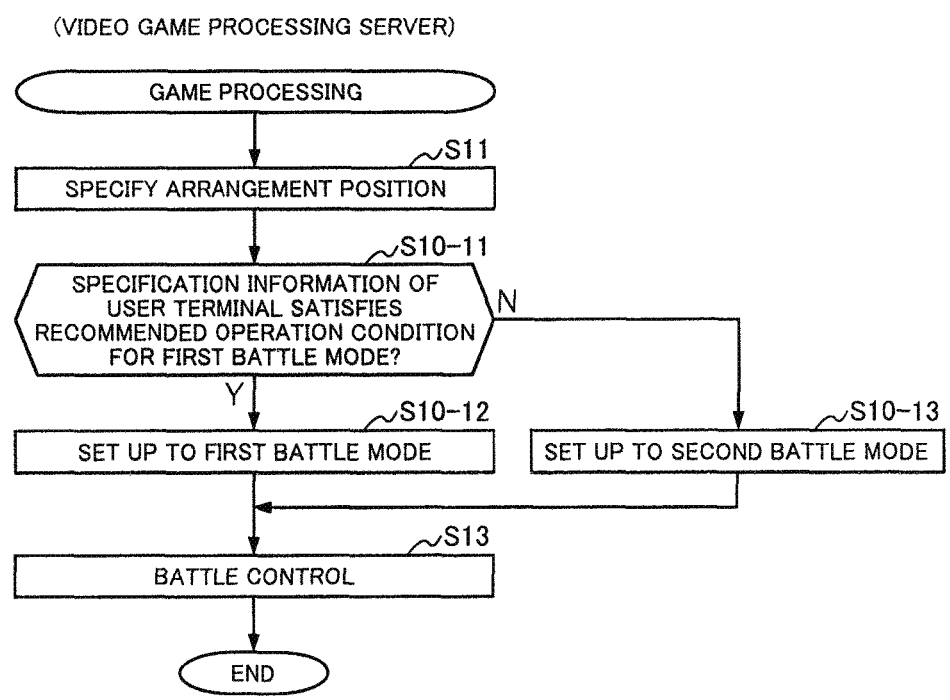
FIG. 21 is a flowchart showing an example of the game processing according to at least one embodiment of the present invention.

FIG. 21 is a flowchart showing an example of the game processing carried out by the video game processing server 10 according to one embodiment of the present invention. Here, a setup of a battle mode in accordance with performance information of the user terminal 20 will be described more specifically.

In the game processing according to the present embodiment, when the arrangement position of each character is specified (Step S11), the video game processing server 10 determines whether performance (for example, specification) of the user terminal 20 satisfies a recommended operation condition for the first battle mode or not (Step S10-11). In the present embodiment, the video game processing server 10 determines whether the specification of the user terminal 20 satisfies the recommended operation condition for the first battle mode or not by comparing information that indicates a recommended operation condition stored in a storage device included in the video game processing server 10 (recommended operation condition information) with specification information of the user terminal 20 that is received from the user terminal 20 and stored in advance. Here, in a case where it is determined that the specification of the user terminal 20 satisfies the recommended operation condition for the first battle mode ("Yes" at Step S10-11), the video game processing server 10 sets up the battle mode to the first battle mode (Step S10-12).

On the other hand, in a case where it is determined that the specification of the user terminal 20 does not satisfy the recommended operation condition for the first battle mode ("No" at Step S10-11), the video game processing server 10 sets up the battle mode to the second battle mode (Step S10-13).

When the battle mode is set up, the video game processing server 10 carries out the battle control in the battle mode thus set up (Step S13).

As explained above, as one aspect of the tenth embodiment, the video game processing server 10 sets up the battle mode to any one battle mode of the first battle mode and the second battle mode in accordance with the performance information of the video game processing apparatus (for example, the specification information of the user terminal 20); and carries out a battle control in the battle mode thus set up. Therefore, it is possible to control progress of the video game in a mode suitable for performance of the computer.

In this regard, the video game processing server 10 may be configured so as to select a battle mode to be set up in accordance with its own performance information. For example, its own performance information is information indicating performance of the video game processing server 10. Further, its own performance information may be information that influence on performance of the server indirectly or directly. An example of such information includes the access number to the video game processing server 10 and a maintenance status of the video game processing server 10.

In this regard, in the example of the tenth embodiment described above, the case where the video game processing server 10 includes the various kinds of functions has been explained as an example. However, the video game processing system 100 may be configured so that the video game processing server 10 does not include apart or all of the various kinds of functions included in the video game processing server 10, but the user terminal (for example, the user terminal 20) includes the part or all of the functions.

Eleventh Embodiment

Figure 22:
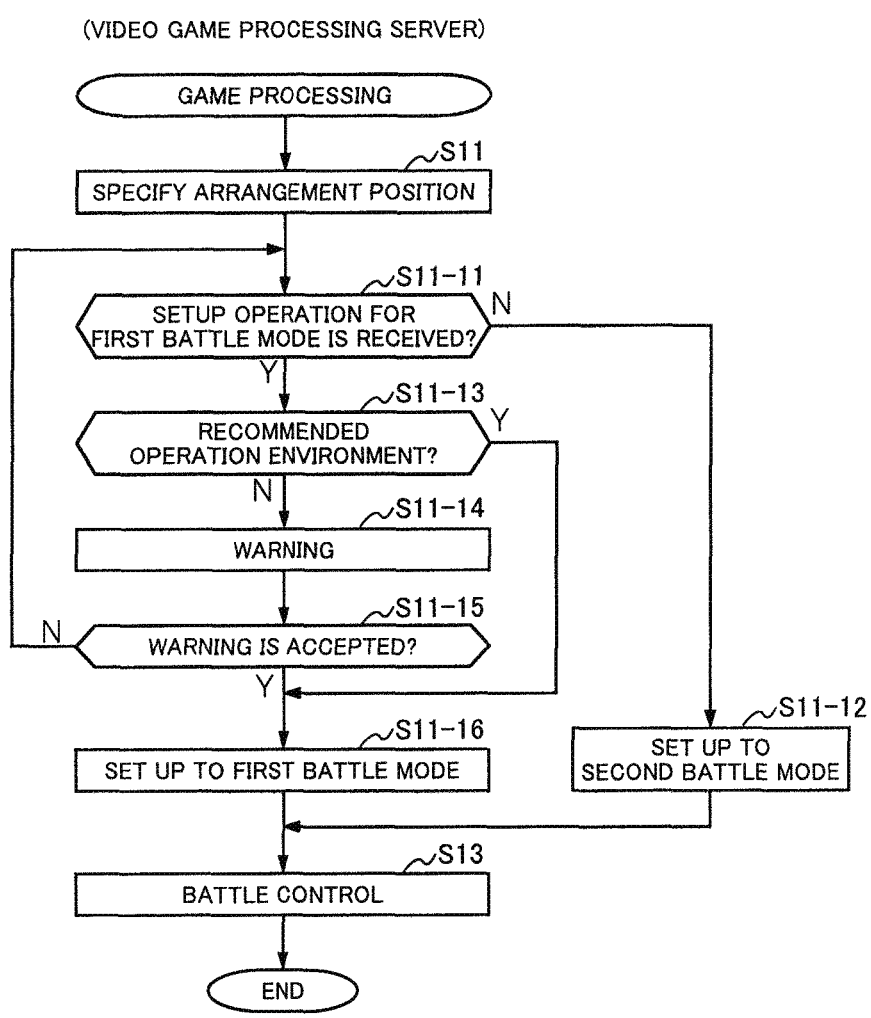
FIG. 22 is a flowchart showing an example of the game processing according to at least one embodiment of the present invention.

FIG. 22 is a flowchart showing an example of the game processing carried out by the video game processing server 10 according to at least one embodiment of the present invention. Here, an operation to set up the battle mode in accordance with a setup operation by the player will be described more specifically.

In the game processing according to the present embodiment, when arrangement of each character is specified, the video game processing server 10 determines whether a setup operation for the first battle mode is received or not (Step S11-11). In this regard, the video game processing server 10 receives an operation for a player via the user terminal 20.

Here, in a case where it is determined that no setup operation for the first battle mode is received ("No" at Step S11-11), the video game processing server 10 sets up the battle mode to the second battle mode (Step S11-12), and carries out a battle control in the battle mode thus set up (Step S13).

On the other hand, in a case where it is determined that the setup operation for the first battle mode is received ("Yes" at Step S11-11), the video game processing server 10 determines whether it is in a recommended operation environment or not (Step S11-13). In the present embodiment, the video game processing server 10 determines whether it is in the recommended operation environment for the first battle mode or not by comparing performance information of the user terminal 20 stored in the storage device therein with the recommended operation condition information. Here, in a case where it is determined that it is in the recommended operation environment, for example, because a version of each of an OS, a browser and a CPU of the user terminal 20 satisfies the recommended operation condition ("Yes" at Step S11-13), the video game processing server 10 causes the processing flow to proceed to a process at Step S11-16 (will be described later).

On the other hand, in a case where it is determined that it is not the recommended operation environment ("No" at Step S11-13), the video game processing server 10 gives the player a warning that it is not the recommended operation environment (Step S11-14). In the present embodiment, the video game processing server 10 generates a warning screen for informing the player that there is a possibility that playing in the first battle mode causes inconvenient situation for the player (for example, an operation speed becomes slower; and transmits the generated warning screen to the user terminal 20.

When the warning is given to the player, the video game processing server 10 determines whether a warning is accepted or not (Step S11-15). In the process at Step S11-14, for example, the video game processing server 10 generates a warning screen (for example, a warning screen provided with a virtual button for answer) that has a function to make a query about whether the warning is accepted or not against the player. Thus, it is possible to determine whether the warning is accepted or not.

Here, in a case where it is determined that the warning is not accepted ("No" at Step S11-15), the video game processing server 10 causes the processing flow to proceed to the process at Step S11-11. Namely, the video game processing server 10 does not accept or permit a setup of the first battle mode in a case where the player does not accept the warning.

On the other hand, in a case where it is determined that the warning is accepted ("Yes" at Step S11-15), the video game processing server 10 sets up the battle mode to the first battle mode (Step S11-16), and carries out the battle control in the battle mode thus set up (Step S13).

As explained above, as one aspect of the eleventh embodiment, the video game processing server 10 is configured so as to set up any one battle mode of the first battle mode and the second battle mode in accordance with a setup operation by the player (more specifically, sets up the battle mode after a warning is given to the user if needed). Therefore, it is possible for the player to play the video game in a mode according to desire of the player.

Further, the video game processing system 100 may be configured so that the video game processing server 10 sets up the battle mode to the second battle mode in a case where it is determined at Step S11-15 in FIG. 22 that warning is not accepted. This makes it possible to same time to receive a setup operation by the player again.

Further, the video game processing server 10 can be configured so that, in a case where it is determined at Step S11-15 in FIG. 22 that the warning is not accepted, the video game processing server 10 generates a game screen (that is, an informing screen) for informing the player that the second battle mode is a mode with a lower processing load than the first battle mode, for example, because rendering is not required, but is a mode for providing game experience similar to that in the first battle mode; and transmits the generated inform screen to the user terminal 20. This makes it possible to avoid a situation that interest in the video game of the player from is got away due to the warning.

Twelfth Embodiment

Figure 23:
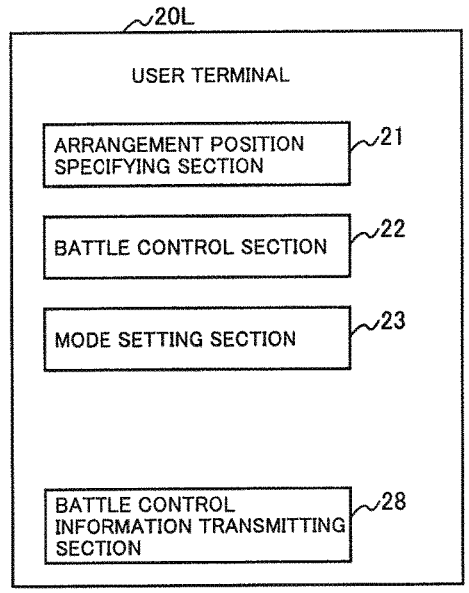
FIG. 23 is a block diagram showing a configuration of the user terminal according to at least one embodiment of the present invention.

FIG. 23 is a block diagram showing a configuration of a user terminal 20L that is an example of the user terminal 20 according to one embodiment of the present invention. In the present embodiment, the user terminal 20L at least includes: an arrangement position specifying section 21; a battle control section 22; a mode setting section 23; and a battle control information transmitting section 28.

The arrangement position specifying section 21 has a function to specify an arrangement position of a character in the virtual space in accordance with progress of the video game.

The battle control section 22 has a function to control a battle in any one of plural kinds of battle modes. In the present embodiment, the battle control section 22 has a function to carry out a battle control in the first battle mode (first battle controlling function) and a function to carry out a battle control in the second battle mode (second battle controlling function).

The mode setting section 23 has a function to set up any one battle mode of the first battle mode and the second battle mode.

The battle control information transmitting section 28 has a function to transmit battle control information (for example, a log) to the video game processing server 10 connected via the communication network 30. The battle control information indicates the control content of the battle control.

Here, one example of the battle control information is various kinds of information that can be stored or accumulated in accordance with progress of the battle. As concrete examples, there are a movement history of each character, an action history and the like. Further, the battle control information may be configured so as to be capable of reproducing the battle control from the beginning to the end, or to be capable of reproducing only a portion for which a predetermined condition (for example, for one minute before termination of the battle) is satisfied.

Figure 24:
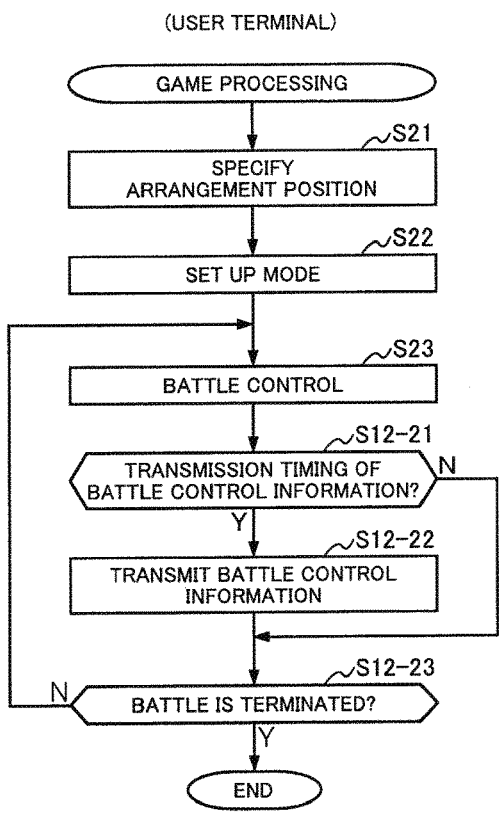
FIG. 24 is a flowchart showing an example of the game processing according to at least one embodiment of the present invention.

FIG. 24 is a flowchart showing an example of the game processing carried out by the user terminal 20L.

In the game processing according to the present embodiment, when the battle control is carried out (Step S23), the user terminal 20L first determines whether it is transmission timing of the battle control information or not (Step S12-21). In the present embodiment, the user terminal 20L determines that it is the transmission timing of the battle control information in a case where the predetermined time elapses or the player does not carry out an operational input for a specific time.

Here, in a case where it is determined that it is not the transmission timing of the battle control information ("No" at Step S12-21), the user terminal 20 causes the processing flow to proceed to the process at Step S23 in FIG. 22.

On the other hand, in a case where it is determined that it is the transmission timing of the battle control information ("Yes" at Step S12-21), the user terminal 20L transmits the battle control information to the video game processing server 10 in accordance with a predetermined transmission rule (Step S12-22). In the present embodiment, the user terminal 20 transmits all pieces of the battle control information thus stored to the video game processing server 10.

When the battle control information is transmitted, the user terminal 20 determines whether the battle is terminated or not (Step S12-23). Here, in a case where it is determined that the battle is not terminated because a predetermined battle terminated condition is not satisfied ("No" at Step S12-23), the user terminal 20L causes the processing flow to proceed to the process at Step S23. On the other hand, in a case where it is determined that the battle is terminated because the predetermined battle terminated condition is satisfied ("Yes" at Step S12-23), the user terminal 20L terminates the processing herein.

As explained above, as one aspect of the twelfth embodiment, the user terminal 20L is configured so as to: include the arrangement position specifying section 21; the battle control section 22; the mode setting section 23; and the battle control information transmitting section 28. Therefore, by transmitting the battle control information, which indicates the control content of the battle control, to the video game processing server via the communication network, for example, it is possible to make an investigation for finding out a so-called cheat action.

Further, transmission determination timing of the battle control information by the user terminal 20L is not limited particularly. For example, the transmission determination timing may be configured so as to use elements different from time when an HP of an enemy character becomes a predetermined value and an operation of the player. However, it is preferable that the transmission determination timing may be configured so that a processing load to transmit the battle control information does not become excessive.

Further, although it has not been mentioned particularly in the twelfth embodiment described above, the video game processing system 100 may be configured so that: the user terminal 20L receives an operation (that is, a skip operation) to request to skip processing for progress of the battle and derive a battle result; carries out processing to derive the battle result when each character is operated in a specific rule (skip processing); and transmits battle control information indicating the course of the skip processing to the video game processing server 10, whereby a progress process of the battle during skipping can be reproduced.

In this regard, in the example of the twelfth embodiment described above, the case where the user terminal 20L includes the various kinds of functions has been explained as an example. However, the video game processing system 100 may be configured so that the user terminal 20L does not include a part or all of the various kinds of functions included in the user terminal 20L, but the video game processing apparatus (for example, the video game processing server 10) includes the part or all of the functions. By configuring the video game processing system 100 in this manner, a manager (or an administrator) of the video game is allowed to make an investigation for finding out a so-called cheat action, and the player is allowed to confirm a state of the battle during skipping after the skip processing is terminated.

Thirteenth Embodiment

FIG. 25 is an explanatory drawing showing an example of a storage state of video game information stored in a storage device according to one embodiment of the present invention. The storage device is configured by a database apparatus, for example. The storage device is a storage medium for storing various kinds of information regarding the video game whose progress is controlled by the video game processing system 100 and various kinds of data such as a control program for the video game.

Here, an outline of the video game whose progress is controlled by the video game processing system 100 will be described. In the present embodiment, the video game processing system 100 controls progress of the video game (for example, a so-called online RPG or a browser game) in which a plurality of characters including the player character operated by the user (player) via any of the plurality of user terminals 20, 201 to 20N (that is, the corresponding user terminal).

In the present embodiment, the video game is configured so as to contain a battle scene in which a character (that is, the player character or avatar) operated by the player (that is, an operator of the user terminal), which is his or her own avatar in the virtual space battles an enemy character. In the video game according to the present embodiment, a user can take an avatar of other user to a battle as a friend (friend character) that battles an enemy character together. In the present embodiment, the user selects one quest in which a battle against an enemy character is set up as a task from a plurality of quests (for example, a task with which a character that appears in the video game is associated), thereby carrying out the battle against the enemy character.

In the present embodiment, a real view mode and a simple view mode are provided as the battle mode.

The real view mode is a mode in which a photographed image of the virtual space photographed by the virtual camera is displayed on the battle screen. In the real view mode, a state that various kinds of characters move in the three-dimensional virtual space is displayed on the display screen of the display device. Namely, the real view mode is one example of the first battle mode described above.

Figure 26:
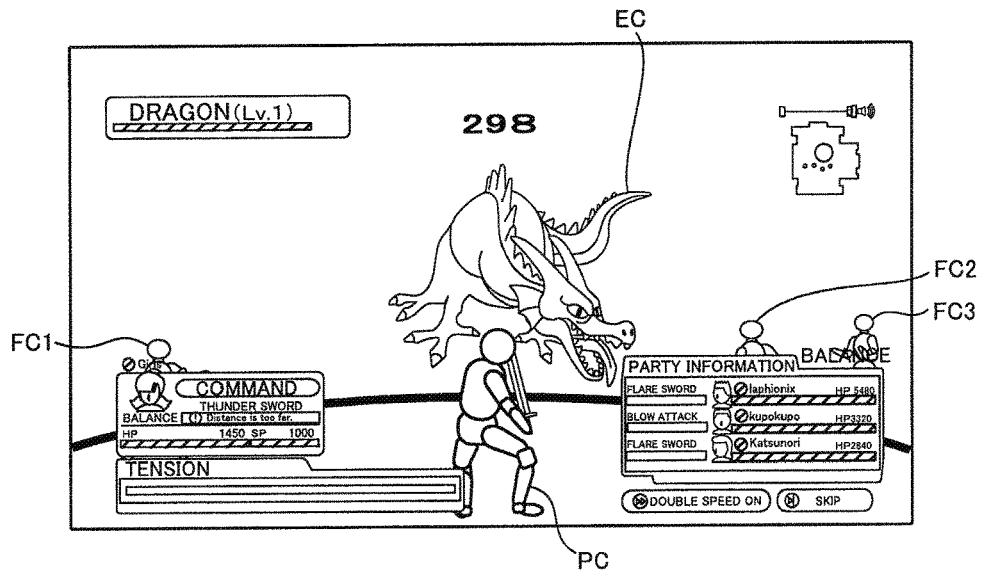
FIG. 26 is an explanatory drawing for explaining a real view mode according to at least one embodiment of the present invention.

FIG. 26 is an explanatory drawing for explaining the real view mode. As shown in FIG. 26, in the real view mode, a battle screen (that is, a real view screen) expressing that a player character PC, a plurality of friend characters FC1 to FC3 and an enemy character EC are arranged in the three-dimensional virtual space is displayed. The player can move a position of the virtual camera by moving the player character, for example.

Figure 27:
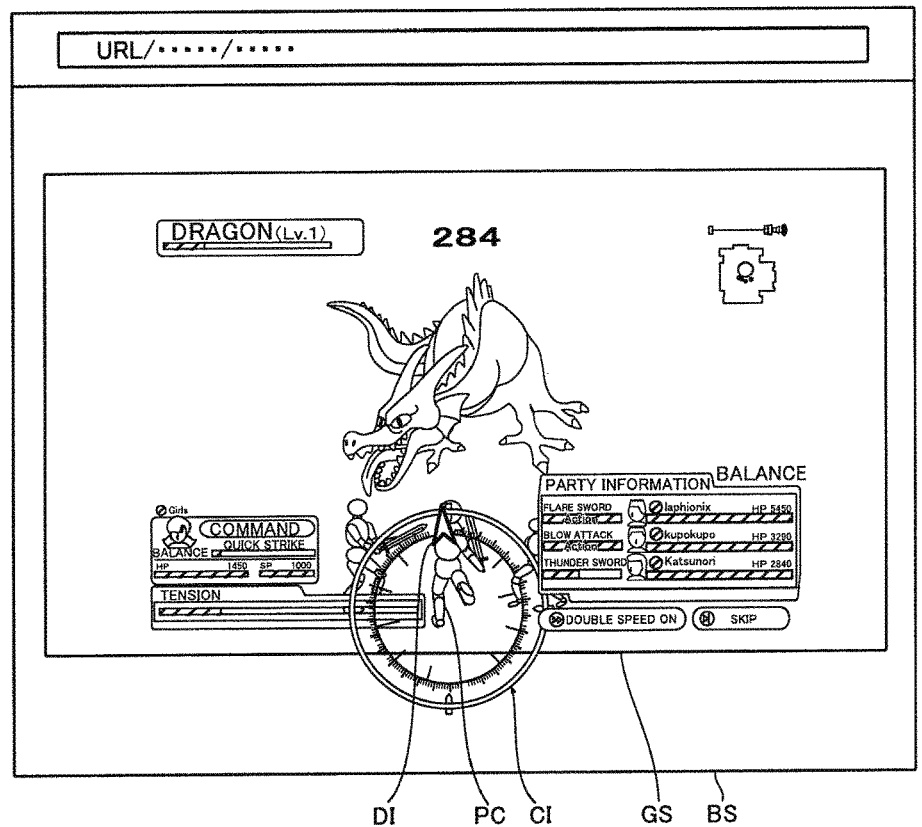
FIG. 27 is an explanatory drawing for explaining an example of a controller image displayed in the real view mode according to at least one embodiment of the present invention.

FIG. 27 is an explanatory drawing for explaining an example of a controller image displayed in the real view mode. As shown in FIG. 27, in the present embodiment, a browser screen display area BS and a game screen display area GS are provided on the display screen of the display device included in the user terminal 20, for example. In a case where a predetermined movement operation by the player (for example, a drag operation using the mouse connected to the user terminal 20) is received in a state that a quest screen (that is, a real view screen) in the real view mode is displayed in the game screen display area GS, the user terminal 20 causes the display device to display a controller image CI on the basis of a position of a mouse cursor.

The controller image CI includes a direction instruction portion DI that moves on an outer edge of the controller image CI. In the present embodiment, the user terminal 20 determines a movement direction and a movement speed of the player character on the basis of the content of the drag operation using the mouse (for example, a direction and a length of a drag operation). Further, in order to inform the player of the operational content according to the drag operation, the user terminal 20 updates a display position of the direction instruction portion DI on the basis of the content of the drag operation. Moreover, in the present embodiment, the user terminal 20 does not limit a display position of the controller image CI in the game screen display area GS. Namely, the user terminal 20 specifies a position of the mouse cursor in a case where a movement operation by the player is received. In a case where the specified position of the mouse cursor is positioned within the game screen display area GS, the user terminal 20 causes the display device to display a controller image within the browser screen display area BS. In this regard, in the present embodiment, the user terminal 20 does not receives any movement operation in a case where the specified position of the mouse cursor is not within the game screen display area GS.

The simple view mode is a mode in which an arrangement image is displayed on the battle screen, in which each character is arranged at a predetermined position with no relationship with the arrangement position of the corresponding character in the virtual space. In the simple view mode, various kinds of characters are arranged in the three-dimensional virtual space, but a state that the various kinds of characters move in the three-dimensional virtual space is not displayed on the display screen of the display device. Namely, the simple view mode is one example of the second battle mode described above.

Figure 28:
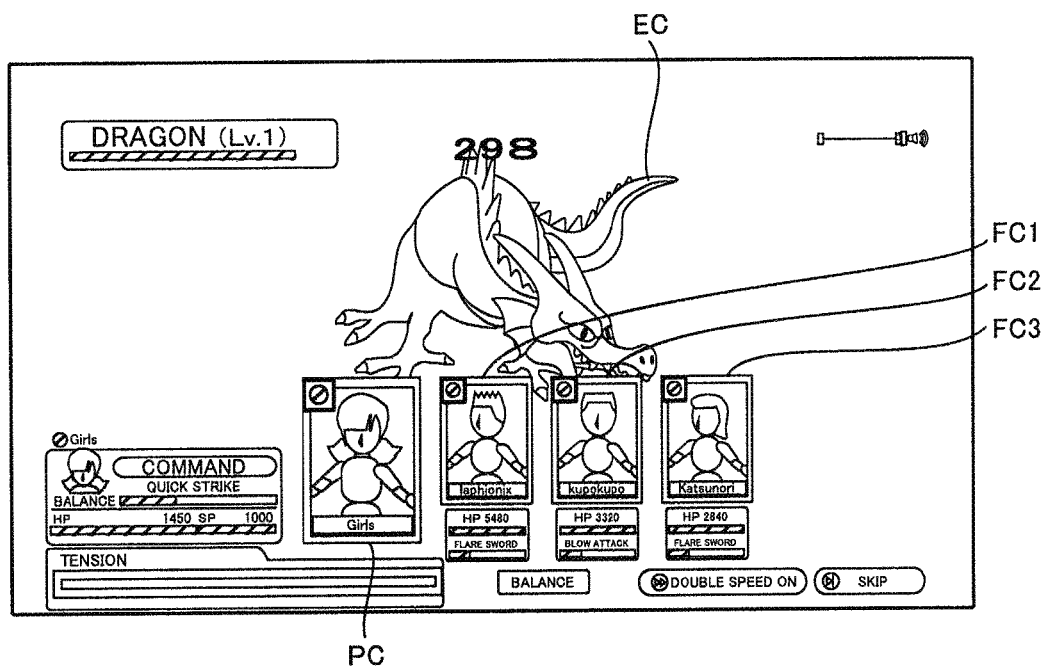
FIG. 28 is an explanatory drawing for explaining the simple view mode according to at least one embodiment of the present invention.

FIG. 28 is an explanatory drawing for explaining the simple view mode. As shown in FIG. 28, in the simple view mode, a battle screen (a simple view screen) in which each of a player character PC and a plurality of friend characters FC1 to FC3 is expressed in a two-dimensional image (in the present embodiment, an image in a card form) is displayed. More specifically, in the simple view mode, the arrangement image in which each character (in the present embodiment, an image in a card form according to each character) is arranged at a predetermined position with no relationship with the arrangement position of the corresponding character in the three-dimensional virtual space is displayed as a simple view screen. By selecting a command, it is possible for the player to cause the player character to make an attack against an enemy character. Further, in the simple view screen according to the present embodiment, the enemy character EC is displayed in the same form as the real view screen. However, the simple view screen is different from the real view screen in view of whether movement is drawn or not. In this regard, an image according to the enemy character EC defined in advance can be display on the simple view screen. As an example of the image defined in advance, it is thought a two-dimensional picture different from the three-dimensional image displayed on the real view screen.

In this regard, the simple view mode may be a mode by which it can be expected to reduce a processing load on the computer compared with the real view mode. For example, the simple view mode may be configured so that the player character is displayed in the same form of the real view screen, or an image indicating a position of each character in the virtual space (for example, a so-called map) is displayed.

By providing a mode, in which a plurality of characters is arranged in the virtual space and a virtual space image obtained by photographing the virtual space is used, and a mode, in which photographing of the virtual space is omitted and an omission image where each character is arranged at a predetermined position (for example, a position at which cards of the player are generally displayed; a position at the lower center of the screen) is used, it is possible to realize the video game in which magnitude of a processing load related to rendering is different and the point to use arrangement in the virtual space is the same. As a result, it is possible to make a difference of game experience, which the player can feel by playing the two modes, smaller. Further, by making the two modes common except for a configuration regarding a screen display, it is possible to reduce a creating load of the video game compared with the case the processing flow corresponding to each mode is constructed.

In order to control progress of the video game described above, as shown in FIG. 25, a quest name for uniquely specifying a quest; a quest type; an enemy character; a view mode type; a consumption energy; and a major acquired item are contained in the video game information according to the present embodiment.

In the present embodiment, the quest includes two types, "search (quest)" and "subjugation (battle)". In the case of playing a quest belonging to "search", the player searches something in the virtual space by consuming a predetermined in-game point. In this case, an enemy character appears in the video game in accordance with a predetermined generating rule. In this regard, since selection of a view mode is not carried out in a battle with the "search" in the present embodiment, its detailed explanation is omitted. However, the video game processing system 100 may be configured so that a plurality of modes designed to become common except for presence or absence of rendering with respect to the "search" can be used.

Further, the view mode type means a type of a view mode corresponding to a quest. In the present embodiment, the types of view modes include a real view mode and a simple view mode. In this regard, in the present embodiment, data sets for carrying out a quest in the user terminal for every type of view mode are prepared as quest information.

Further, the consumption energy means an in-game point that the user consumes in the case of playing a quest. In this regard, the video game processing system 100 may be configured so that a difference is provided in the consumption energy in accordance with a type of the view mode with respect to the same quest.

As explained above, each of the embodiments according to the present application allows one deficiency (or shortage) or two or more deficiencies (or shortages) to be solved. In this regard, the effect according to each of the embodiments described above is a non-limiting effect or one example of the effects.

In this regard, although it has not been mentioned particularly in each of the embodiments described above, the video game processing apparatus (for example, the video game processing server 10 or the user terminal 20) may be configured so as to accept or permit entry to the video game by other player. In this case, for example, the video game processing server 10 may be configured so as to contain information indicating a character (entry character) of an entry player into a quest screen or to cause the entry character to appear in the video game during progress of the quest. In this case, for example, the video game processing apparatus may be configured so that the user terminal 20 receives information for controlling an operation of the entry character from the video game processing server 10. Alternatively, the video game processing apparatus may be configured so that the user terminal 20 controls the entry character in accordance with the same rule as other friend character. Further, for example, the video game processing apparatus may be configured so that the video game processing server 10 generates the information for controlling an operation of the entry character in the user terminal 20 on the basis of logs received from each user terminal.

Further, in each of the embodiments described above, each of the plurality of user terminals 20, 201 to 20N and the video game processing server 10 carries out the various kinds of processings described above in accordance with various kinds of control programs (for example, a video game processing program) stored in a storage device provided therein.

In this regard, the configuration of the video game processing system 100 is not limited to the configurations that have been explained as an example of each of the embodiments described above. For example, the video game processing system 100 may be configured so that the video game processing server 10 carries out part or all of the processings that have been explained as the processings carried out by the user terminal. Alternatively, the video game processing system 100 may be configured so that any of the plurality of user terminals 20, 201 to 20N (for example, user terminal 21) carries out part or all of the processings that have been explained as the processings carried out by the video game processing server 10. Further, the video game processing system 100 may be configured so that each of the user terminals 20, 201 to 20N includes a part or all of the storage sections included in the video game processing server 10. Namely, the video game processing system 100 may be configured so that one of the user terminal 21 and the video game processing server 10 in the video game processing system 100 has a part or all of the functions that the other has.

Further, the video game processing program may be configured so as to cause a single apparatus that has no communication network to realize a part or all of the functions that have been explained as an example of each of the embodiments described above.

Further, in each of the embodiments described above, the language "in accordance with progress of the video game" means that occurrence of various kinds of progress or changes and the like that can occur in the video game becomes an opportunity or basis of specific processing. As an example of the specific processing, for example, determining processing is thought. Further, as an example of the various kinds of progress or changes and the like that can occur in the video game, progress of a time, a change in an element value in the video game, update of a specific status or a flag, or an operational input by the user are thought.

INDUSTRIAL APPLICABILITY

The present invention is useful to reduce a difference of game experience that may occur among a plurality of users.

What is claimed is:

1. A non-transitory computer-readable medium including a video game processing program product for causing a computer to control progress of a video game, a plurality of characters including a player character appearing in the video game, a player operating the player character, the video game processing program product causing the computer to execute:
    specifying an arrangement position of at least one of the plurality of characters in a virtual space in accordance with progress of the video game;
    setting up a display mode to any one of a first display mode and a second display mode, a first game control being carried out in the first display mode in which a photographed image of the virtual space photographed by a virtual camera is displayed on a game screen, a second game control being carried out in the second display mode in which an arrangement image is displayed on the game screen, each of the plurality of characters being arranged at a predetermined position in the arrangement image with a predetermined relationship with the arrangement position of the corresponding character in the virtual space, the predetermined relationship being that a position of each of the plurality of characters in the virtual space and a position of each of the plurality of characters in the arrangement image do not influence each other; and
    carrying out one of the first game control and the second game control in the display mode set up in the setting up a display mode,
    wherein the photographed image is not displayed in the second display mode.

2. The non-transitory computer-readable medium according to claim 1, wherein the video game processing program product causes the computer to further execute:
    determining an action effect based on an action of each of the plurality of characters in the game; and
    setting up an arrangement position of each of the plurality of characters in the virtual space to a fixed position in a case where the display mode is set up to the second display mode in the setting up a display mode,
    wherein in the determining an action effect, the action effect is determined based on positional relationship information corresponding to a fixed position that is the arrangement position of the at least one of the plurality of characters specified in the specifying an arrangement position.

3. The non-transitory computer-readable medium according to claim 1, wherein the video game processing program product causes the computer to further execute:
    determining an action effect based on an action of each of the plurality of characters in the game; and
    determining an arrangement position of each of the plurality of characters in the virtual space to be any one of a plurality of prescribed positions in a case where the display mode is set up to the second display mode in the setting up a display mode,
    wherein in the determining an arrangement position, the arrangement position is changed into other prescribed position in accordance with progress of the second game control, and
    wherein in the determining an action effect, the action effect is determined based on positional relationship information corresponding to any prescribed position at which the at least one of the plurality of characters specified in the specifying an arrangement position is arranged.

4. The non-transitory computer-readable medium according to claim 1, wherein any one display mode of the first display mode and the second display mode is set up in accordance with performance information of a video game processing apparatus in the setting up a display mode.

5. The non-transitory computer-readable medium according to claim 1, wherein any one display mode of the first display mode and the second display mode is set up in accordance with a setup operation by the player in the setting up a display mode.

6. The non-transitory computer-readable medium according to claim 1, wherein the video game processing program product causes the computer to further execute:
    transmitting game control information to a video game processing server connected via a communication network, the game control information indicating a control content of the one of the first game control and the second game control.

7. The non-transitory computer-readable medium according to claim 1, wherein the second display mode is performed without the computer executing image rendering.

8. The non-transitory computer-readable medium according to claim 1, wherein the plurality of player characters are at fixed positions in the arrangement image.

9. The non-transitory computer-readable medium according to claim 1, wherein the plurality of player characters are at fixed positions in the arrangement image until a predetermined condition is satisfied.

10. The non-transitory computer-readable medium according to claim 9, wherein the predetermined condition includes a termination of a battle.

11. The non-transitory computer-readable medium according to claim 1, wherein one of the first display mode and the second display mode is selected by the player.

12. The non-transitory computer-readable medium according to claim 1, wherein the predetermined position in the arrangement image of each of the plurality of characters is not moved in a case where the arrangement position of the corresponding character in the virtual space is moved.

13. The non-transitory computer-readable medium according to claim 1, wherein the video game processing program product causes the computer to further execute:

carrying out a battle in one of the first display mode and the second display mode set up in the setting up a display mode.

14. The non-transitory computer-readable medium according to claim 1, wherein the arrangement position is a position within the virtual space in which the plurality of characters is arranged.

15. The non-transitory computer-readable medium according to claim 1, wherein the video game processing program product causes the computer to further execute:
carrying out the one of the first game control and the second game control which is affected by the arrangement position in the display mode set up in the setting up a display mode, and
specifying the arrangement position in accordance with the progress of the video game.

16. A non-transitory computer-readable medium including a terminal program product for causing a video game processing terminal to control progress of the video game while displaying a game screen on a display screen of a display device, the terminal program product causing the video game processing terminal to execute:
connecting the video game processing terminal to a video game processing server via a communication network, wherein the video game processing server comprises:
a processor; and
a memory including instructions that, when executed by the processor, cause the processor to perform operations including:
specifying an arrangement position of at least one of the plurality of characters in a virtual space in accordance with progress of the video game;
setting up a display mode to any one of a first batt display 1e mode and a second display mode, a first game control being carried out in the first display mode in which a photographed image of the virtual space photographed by a virtual camera is displayed on a game screen, a second game control being carried out in the second display mode in which an arrangement image is displayed on the game screen, each of the plurality of characters being arranged at a predetermined position in the arrangement image with a predetermined relationship with the arrangement position of the corresponding character in the virtual space, the predetermined relationship being that a position of each of the plurality of characters in the virtual space and a position of each of the plurality of characters in the arrangement image do not influence each other; and
carrying out one of the first game control and the second game control in the display mode set up in the setting up a display mode,
wherein the photographed image is not displayed in the second display mode.

17. A video game processing method of causing a video game processing server to control progress of a video game carried out by a video game processing apparatus, a plurality of characters including a player character appearing in the video game, a player of the video game processing apparatus operating the player character, the video game processing server being connected to the video game processing apparatus via a communication network, the video game processing method comprising:
specifying an arrangement position of at least one of the plurality of characters in a virtual space in accordance with progress of the video game;
setting up a display mode to any one of a first display mode and a second display mode, a first game control being carried out in the first display mode in which a photographed image of the virtual space photographed by a virtual camera is displayed on a game screen in the video game processing apparatus, a second game control being carried out in the second display mode in which an arrangement image is displayed on the game screen in the video game processing apparatus, each of the plurality of characters being arranged at a predetermined position in the arrangement image with a predetermined relationship with the arrangement position of the corresponding character in the virtual space, the predetermined relationship being that a position of each of the plurality of characters in the virtual space and a position of each of the plurality of characters in the arrangement image do not influence each other; and
carrying out one of the first game control and the second game control in the display mode set up in the setting up a display mode,
wherein the photographed image is not displayed in the second display mode.

* * * * *